United States Patent [19]

Kitamura et al.

[11] Patent Number: 4,575,934

[45] Date of Patent: Mar. 18, 1986

[54] METHOD AND SYSTEM FOR AUTOMATICALLY ATTACHING SUB-ASSEMBLY TO MAIN ASSEMBLY USING INDUSTRIAL ROBOTS

[75] Inventors: Kengo Kitamura, Koshigaya; Hitoshi Murata, Zama, both of Japan

[73] Assignee: Nissan Motor Company, Limited, Yokohama, Japan

[21] Appl. No.: 534,241

[22] Filed: Sep. 21, 1983

[30] Foreign Application Priority Data

| Sep. 22, 1982 | [JP] | Japan | 57-163960 |
| Sep. 22, 1982 | [JP] | Japan | 57-163961 |
| Sep. 22, 1982 | [JP] | Japan | 57-163962 |
| Dec. 29, 1982 | [JP] | Japan | 57-230298 |

[51] Int. Cl.⁴ .................................. B23P 21/00
[52] U.S. Cl. ....................................... 29/787
[58] Field of Search .......... 29/783, 787, 791, 793-795, 29/797

[56] References Cited

U.S. PATENT DOCUMENTS

| 3,885,295 | 5/1975 | Engelberger ................. 29/787 |
| 4,155,169 | 5/1979 | Drake et al. |
| 4,197,627 | 4/1980 | Hirabayashi et al. |
| 4,476,627 | 10/1984 | Matsuura ..................... 29/791 |

FOREIGN PATENT DOCUMENTS

| 2445559 | 4/1975 | Fed. Rep. of Germany . |
| 2464786 | 3/1981 | France . |

OTHER PUBLICATIONS

Rembold et al., "Technische Anforderrungen an Zukuenftige Montageroboter", VDI-Zeitung, vol. 123, No. 18, (Sep. 1981), pp. 763-773.

*Primary Examiner*—Howard N. Goldberg
*Assistant Examiner*—Steven Nichols
*Attorney, Agent, or Firm*—Schwartz, Jeffery, Schwaab, Mack, Blumenthal & Evans

[57] ABSTRACT

A method and system for automatically attaching a sub-assembly such as a strut assembly of a strut-type front suspension to a main assembly such as a vehicle body which is transported on a conveyor belt. The method comprises the following steps of: (a) grasping the sub-assembly stored in a bin, carrying the sub-assembly toward the main assembly stopped on the conveyor belt by means of a mechanical hand attached to one of two industrial robots and, on the other hand, carrying an automatic fastening tool holding fastening means toward the main assembly by means of the other robot; (b) positioning the fastening tool carried to the main assembly with respect to the sub-assembly carried to the main assembly; (c) rendering the fastening tool supported by the supporting apparatus and grasped sub-assembly movable with respect to the supporting apparatus and mechanical hand according to the stopped position of the main assembly, while maintaining the positional relationship between the fastening tool and sub-assembly; (d) positioning the fastening tool and sub-assembly with respect to the main assembly; and (e) fastening the fastening means held by the fastening tool to the sub-assembly so that the sub-assembly is attached to the main assembly, while rendering the fastening tool and sub-assembly fixed to the supporting apparatus and mechanical hand, respectively.

19 Claims, 46 Drawing Figures

FIG. 13
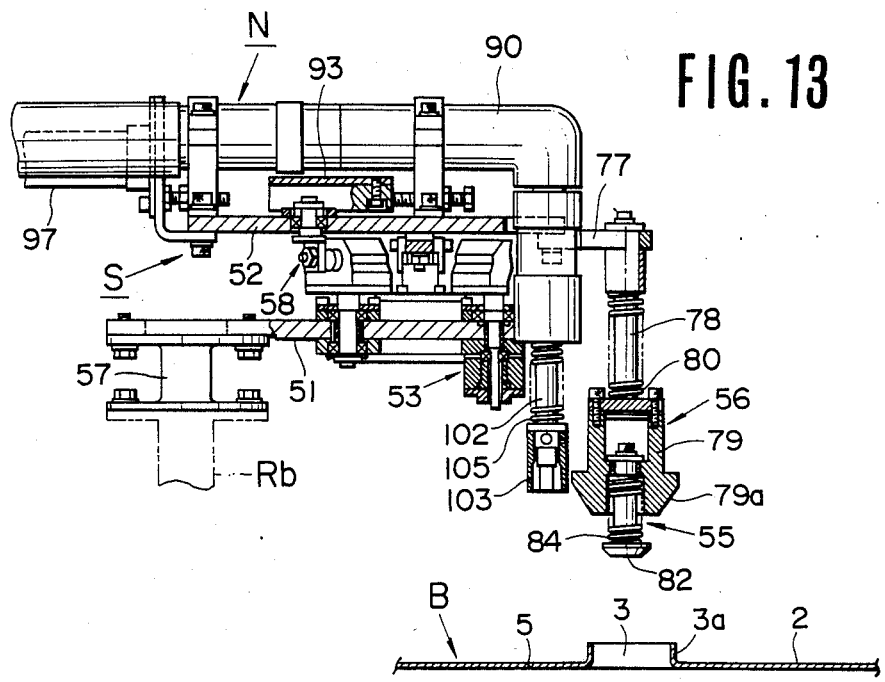
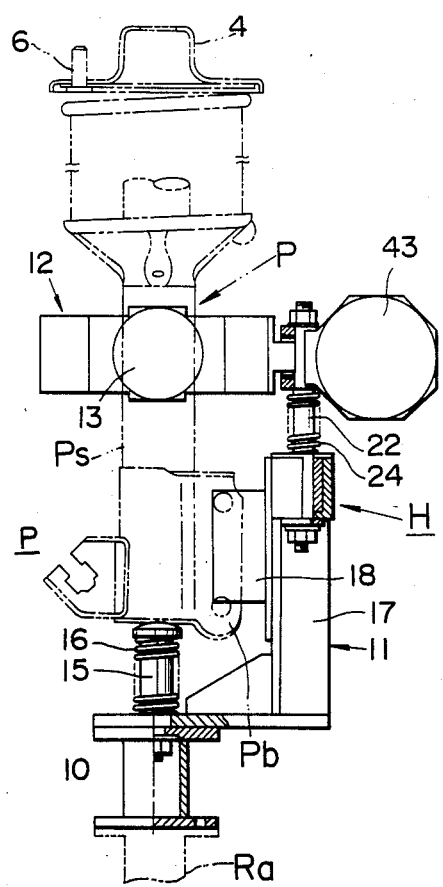

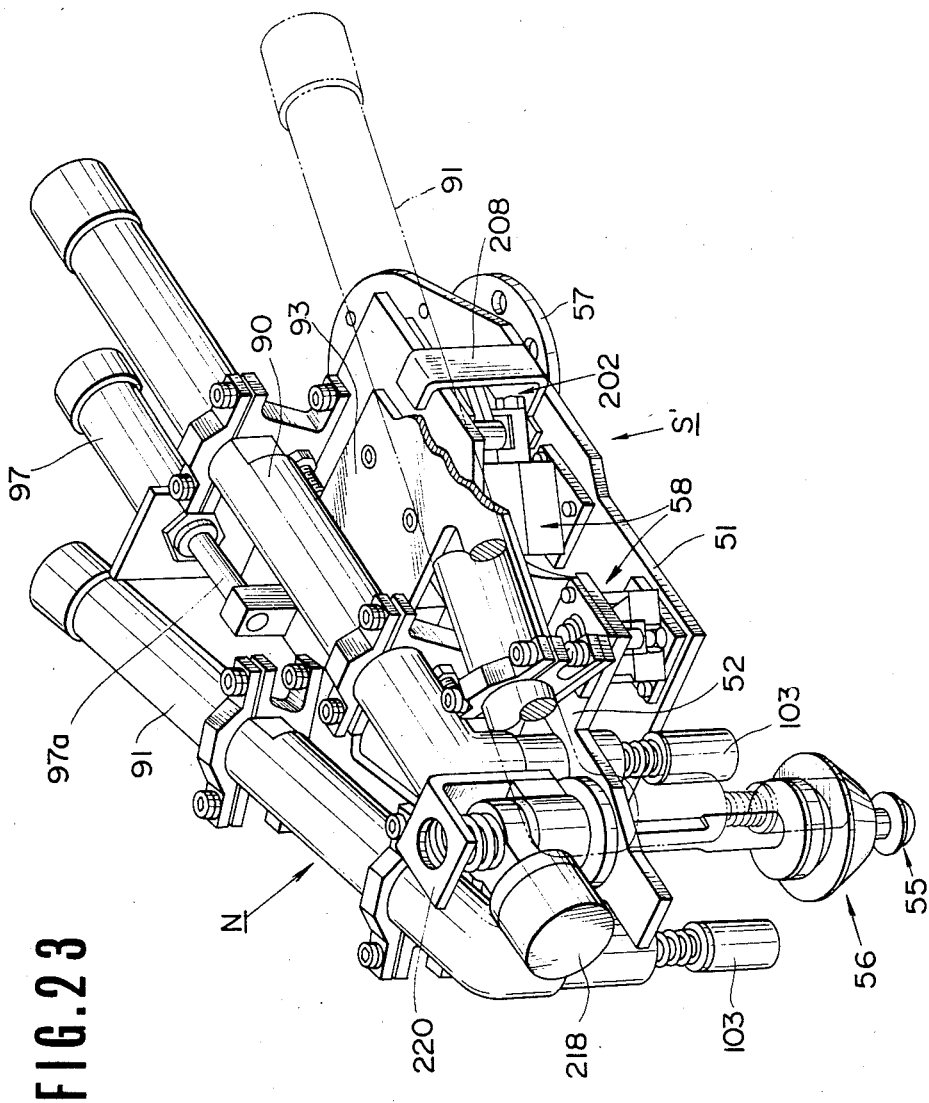

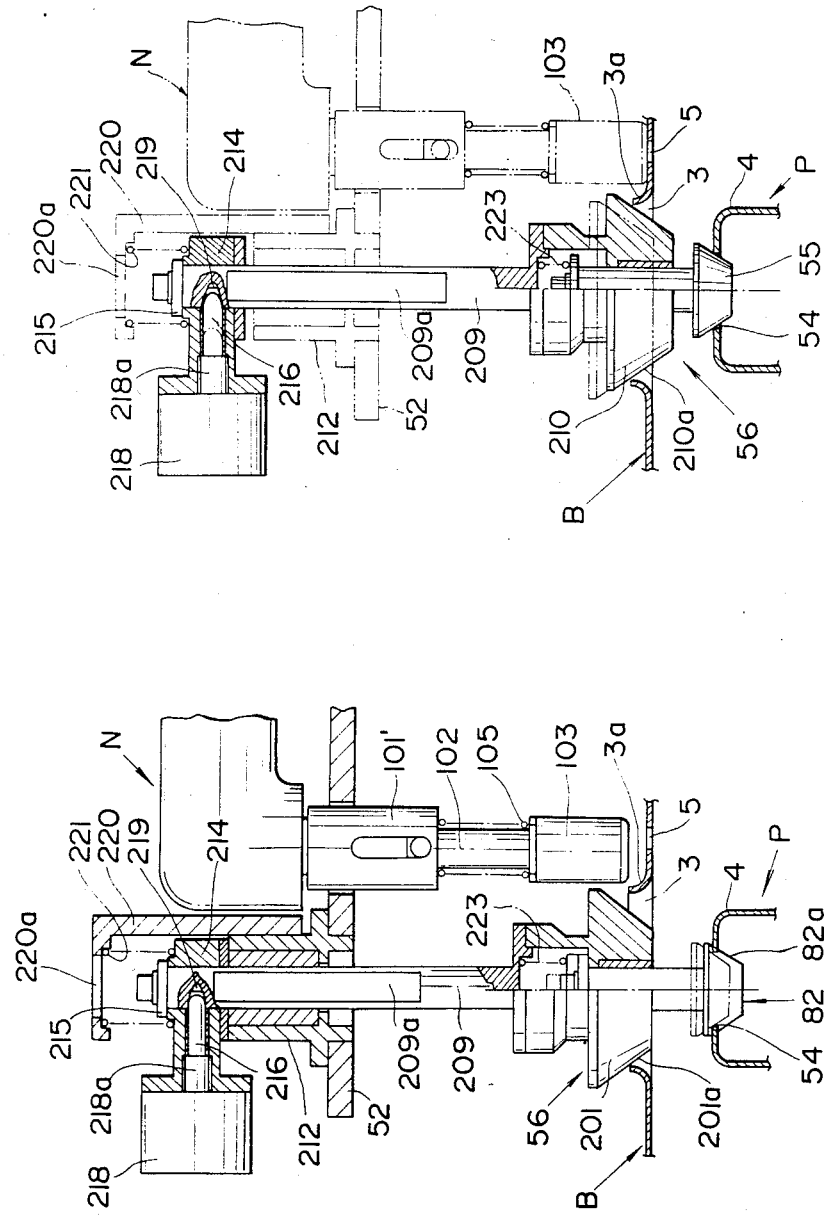

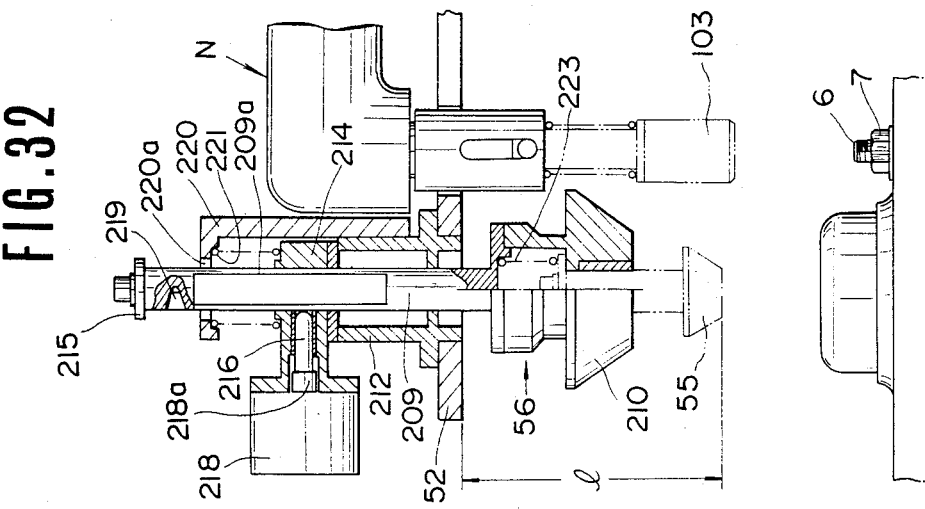
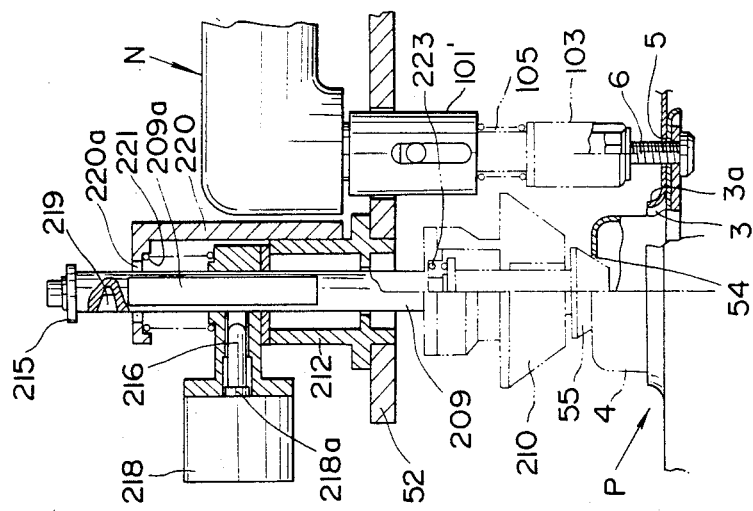

METHOD AND SYSTEM FOR AUTOMATICALLY ATTACHING SUB-ASSEMBLY TO MAIN ASSEMBLY USING INDUSTRIAL ROBOTS

BACKGROUND OF THE INVENTION

1. Field of the Invention

The present invention relates generally to a method and system for automatically attaching a sub-assembly to a main assembly using two industrial robots and, particularly, relates to a method and system for automatically attaching a sub-assembly such as a strut assembly of a strut-type front suspension to a predetermined position of a main assembly such as a strut tower of a vehicle body by means of fastening means such as a nut and repeating such an operation whenever the main assembly is transported on a conveyor belt.

2. Description of the Prior Art

Conventionally, a plurality of operators carry out manually such an assembly operation in an assembly line of, e.g., automotive vehicles as attaching a sub-assembly, e.g., a strut assembly of a strut-type front suspension (hereinafter, simply referred to as a strut) to a main assembly, e.g., a vehicle body whenever the main assembly, i.e., vehicle body is transported on a conveyor belt.

In other words, one of the plurality of operators carries one of the struts stored in a bin to the vehicle body to fit an upper extended portion of the strut into a positioning hole located at a predetermined position of the vehicle body so as to position the strut and holds the strut at the predetermined position, maintaining the strut fitted into the positioning hole. Subsequently, another operator carries a nut fastening tool to the predetermined position and manipulates the nut fastening tool to fasten at least two nuts into threaded portions of corresponding bolts projected from the strut which have previously been inserted through corresponding bolt inserting holes provided at predetermined positions of the vehicle body. In this way, the attaching of a single strut to the predetermined position of the vehicle body is completed.

However, it is troublesome for the operators to carry out the above-described assembly operation since a considerably long working time is required and, in addition, the strut is relatively heavy for carrying it to the vehicle body to attach to the vehicle body.

Therefore, there arises an industrial demand for automating such assembly operations without intervention of these operations.

A method for automatically attaching the strut to the vehicle body includes the utilization of industrial robots. Such a method, for example, comprises the following steps of: (a) positioning the vehicle body on the conveyor belt; (b) grasping and carrying the strut using one of two robots to place the upper engagement portion of the strut at the predetermined position of the vehicle body while carrying a nut fastening tool holding fastening means using the other robot to the predetermined position of the vehicle body at which the strut is fixedly attached to the vehicle body with the nuts. In the step (b), each of the robots carries the strut and fastening tool at the predetermined position on a predetermined trajectory determined by pre-programmed position teachings of a robot control unit, such as a microcomputer.

However, there is a problem in the above-described method that the strut and fastening tool are placed at a position deviated from the predetermined position at which the strut carried by the one robot is to be attached to the vehicle body by means of nuts held by the fastening tool attached on the other robot since the accuracy of positioning the vehicle body at a predetermined stop position is relatively low from the standpoint of the present control technology. Therefore, although it is necessary to carry the strut at a position required for attaching the strut to the vehicle body and also to position the fastening tool at the position required for attaching the strut to the vehicle body, it requires more time to have the strut and fastening tool positioned with respect to the vehicle body separately. Consequently, the total working time for securely attaching the strut to the vehicle body cannot be reduced. In addition, if the robots are adapted to play the roles of positioning strut and fastening tool, a control unit storing pre-programmed instructions on which the robots move the strut and fastening tool to locate at their respectively required positions with respect to the vehicle body is additionally required so that the whole system for automatically attaching the strut to the vehicle body becomes complicated.

It should be noted that such problems arise not only in the case where the strut is attached to the vehicle body but also arises in such cases where other workpieces are attached to a main workpiece which is transported on the conveyor belt.

SUMMARY OF THE INVENTION

With the above-described problems in mind, it is a main object of the present invention to provide a method and system for automatically attaching a sub-assembly to a main assembly transported on a conveyor belt by using two industrial robots which can carry out easily the positioning between an automatic fastening tool and sub-assembly and positioning of the prepositioned fastening tool and sub-assembly with respect to the main assembly in a very short time and can automatically attach the sub-assembly to the main assembly without the need for controlling the robots to position the sub-assembly and fastening tool with respect to the main assembly, with relatively low accuracy in locating the main assembly at a predetermined stop position of the conveyor belt in an assembly line of, e.g., automotive vehicles taking into consideration.

It is another object of the present invention to provide a mechanical hand adapted for with one of the industrial robots of the above-described system, which grasps the sub-assembly to carry the sub-assembly toward a predetermined position of the main assembly and attaches the sub-assembly to the predetermined position of the main assembly, cancelling an error in relative positions between the sub-assembly and main assembly by rendering the grasped sub-assembly movable according to the positional error when the grasped sub-assembly is attached to the predetermined position of the main assembly by using a predetermined guide member.

It is still another object of the present invention to provide a supporting apparatus of an automatic fastening tool holding fastening means adapted for use with the other industrial robot of the above-described system which can easily and accurately position the fastening tool with respect to the main assembly without controlling the robot together with cancelling the positioning error of the sub-assembly with respect to the main assembly on condition that the relative position between the main assembly and fastening tool is erroneous.

It is further object of the present invention to provide the supporting apparatus of the fastening tool for the other industrial robot which can prevent a load from being applied to the supporting apparatus itself and improve durability of the supporting apparatus.

The method of automatically attaching the sub-assembly to the main assembly comprises essentially the following steps of:

(a) grasping one of the sub-assemblies stored in a bin, carrying the sub-assembly toward the main assembly stopped on the conveyor belt by means of the mechanical hand attached to one of two industrial robots and, on the other hand, carrying the automatic fastening tool holding fastening means toward the main assembly by means of the other robot via the supporting apparatus;

(b) positioning the fastening tool carried to the main assembly with respect to the sub-assembly carried to the sub-assembly;

(c) rendering the fastening tool supported by the supporting apparatus and grasped sub-assembly movable with respect to the supporting apparatus and mechanical hand, respectively, according to the stopped position of the main assembly, while maintaining the positional relationship between the fastening tool and sub-assembly;

(d) positioning the fastening tool and sub-assembly with respect to the main assembly; and (e) fastening the fastening means held by the fastening tool to the sub-assembly so that the sub-assembly is attached to the main assembly, while rendering the fastening tool and sub-assembly fixed to the supporting apparatus and mechanical hand, respectively.

The system for automatically attaching the sub-assembly to the main assembly comprises essentially:

(a) supporting apparatus attached to one of two industrial robots for supporting the automatic fastening tool, the supporting apparatus including a base member fixed to a multi-articulated arm of the robot, a movable member supported on the base member so as to become operatively float with respect to the base member and on which the fastening tool is fixedly supported, a lock means intervened between the movable member and base member for locking and unlocking the movable member so as to render the movable member fixed and float with respect to the base member, an engagement member attached to the movable member for engaging an engagement portion of the sub-assembly so as to position the fastening tool with respect to the sub-assembly, the locking means locking the movable member when the engagement member is engaged with the engagement portion of the sub-assembly, and a guide member attached to the movable member for engaging a positioning portion of the main assembly in such a way that the guide member is moved toward a center of the positioning portion of the main assembly, the locking means unlocking the movable member when the guide member is engaged with the positioning portion of the main assembly; and (d) a mechanical hand, attached to a multi-articulated arm of the other robot, the mechanical hand including a main frame fixed to the multi-articulated arm of the other robot, a pair of clamping members which operatively grasps the sub-assembly in such a way that the sub-assembly is fixedly grasped when the engagement member of the supporting apparatus is engaged with the engagement portion of the sub-assembly so as to position the fastening tool and sub-assembly and the sub-assembly is floatingly grasped when the guide member of the supporting apparatus is engaged with the positioning portion of the main assembly so as to position the fastening tool and sub-assembly with respect to the main assembly, and a lock means for locking and unlocking the pair of clamping members so as to render the sub-assembly fixedly grasped and floatingly grasped by the pair of clamping members.

BRIEF DESCRIPTION OF THE DRAWINGS

A more complete understanding of the present invention may be obtained from the following detailed description taken in conjunction with the drawings in which like reference numerals designate corresponding elements and in which:

FIG. 13 is an explanatory view showing a relative positional relationship among the strut, vehicle body, and fastening tool before the grasped strut is attached to the vehicle body;

FIG. 23 is a perspective view of another example of the supporting apparatus;

FIG. 29 is an essential part sectioned explanatory view showing that a tapered portion of a guide member of the supporting apparatus shown in FIGS. 23 through 28 is brought in contact with the flange of the positioning hole of the vehicle body;

FIG. 30 is an essential part sectioned explanatory view showing that the tapered portion of the guide member is completely fitted into the positioning hole of the vehicle body;

FIG. 31 is an essential part sectioned explanatory view showing that a shaft of the guide member is moved upward when a nut runner constituting the fastening tool is operated;

FIG. 32 is an essential part sectioned explanatory view showing that the supporting apparatus is moved upward so as to separate from the strut tower at which the strut is attached to the vehicle body;

DETAILED DESCRIPTION OF THE PREFERRED EMBODIMENTS

Reference will be made to the drawings in order to facilitate understanding of the present invention.

Figure 1:
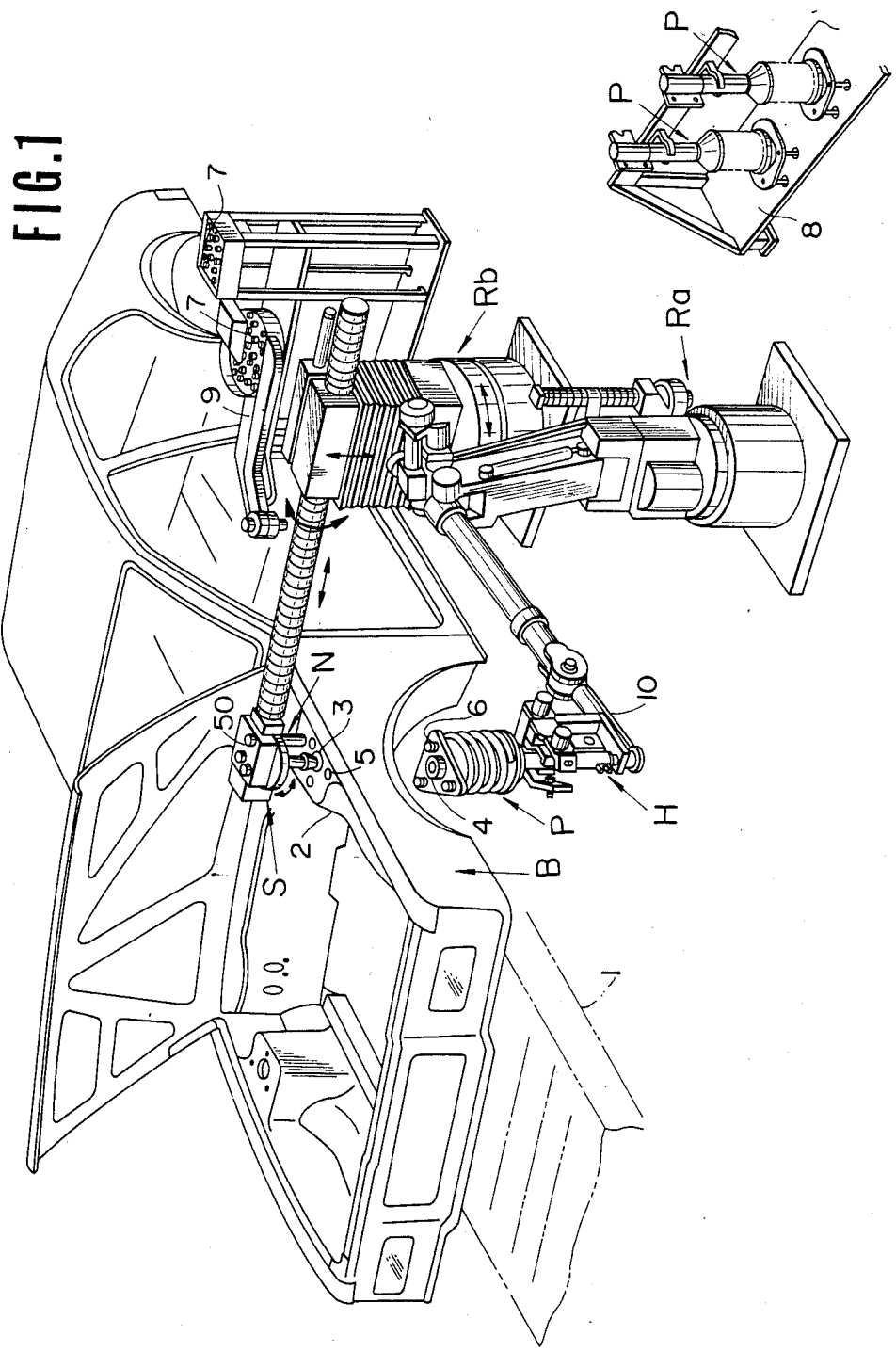
FIG. 1 is a perspective view showing schematically a process of attaching a strut to a vehicle body to which one preferred embodiment of a system for automatically attaching a sub-assembly to a main assembly according to the present invention is applied.

First, FIG. 1 shows diagrammatically a process of automatically attaching a sub-assembly to a main assembly. In this embodiment, a strut P is used as the sub-assembly in the process of manufacturing an automotive vehicle and a vehicle body B is used as the main assembly.

As shown in FIG. 1, the vehicle body B is mounted and transported on a conveyor belt 1 for attaching various vehicle parts thereto. The conveyor belt 1 is stopped at a predetermined position at which the operation of attaching the strut P to a strut tower 2 of the vehicle body B is started. The system for automatically attaching the strut P to the vehicle body B of the preferred embodiment is placed at a working spot in the vicinity of the conveyor belt 1. The system described above comprises: (a) a mechanical hand H attached to one of two industrial robots, i.e., a first robot Ra for grasping the strut P; (b) an automatic nut fastening tool N for fastening a nut as fastening means attached to the other robot, i.e., a second Rb via a supporting apparatus S. The strut P is carried by means of the mechanical hand H toward the strut tower 2 of the vehicle body B which is stopped at the predetermined position on a basis of pre-programmed instructions stored in a control unit, the first robot Ra moving the mechanical hand H toward a position at which the strut tower 2 is placed on a basis of the pre-programmed instructions. The nut fastening tool N is, at the same time, carried by means of the second robot Rb toward the position of the strut tower 2 of the vehicle body B on a basis of pre-programmed instructions, the second robot Rb moving the nut fastening tool N via the supporting apparatus S on a basis of the pre-programmed instructions. The vehicle body B is, on the other hand, provided with the strut tower 2 at which the strut is attached to the vehicle body. The strut tower 2 has such a construction that a positioning hole 3 is located at a center thereof and a plurality of bolt inserting holes 5 are located beside the positioning hole 3 each spaced at a predetermined distance from the positioning hole 3 and one of the holes 5 being equal distance from other adjacent holes 5. After carrying the strut P and nut fastening tool N toward the strut tower 2, an upper casing 4 of the strut P is fitted into the positioning hole 3 of the strut tower 2 and a plurality of bolts 6 projected from the vicinity of the upper casing 4 are inserted through the corresponding bolt inserting holes 3. Thereafter, a plurality of nuts 7 held by the fastening tool N are engaged with the bolts 6 by means of the nut fastening tool N to tighten the bolts 6. Consequently, the strut P is attached appropriately to the vehicle body B.

In FIG. 1, numeral 8 denotes a bin for storing a plurality of struts P to prepare for the above-described attaching operation and numeral 9 denotes a nut feed for feeding a plurality of nuts 7 to the nut fastening tool N.

FIGS. 2 through 5 show the construction of the mechanical hand H used in this embodiment.

Figure 2:
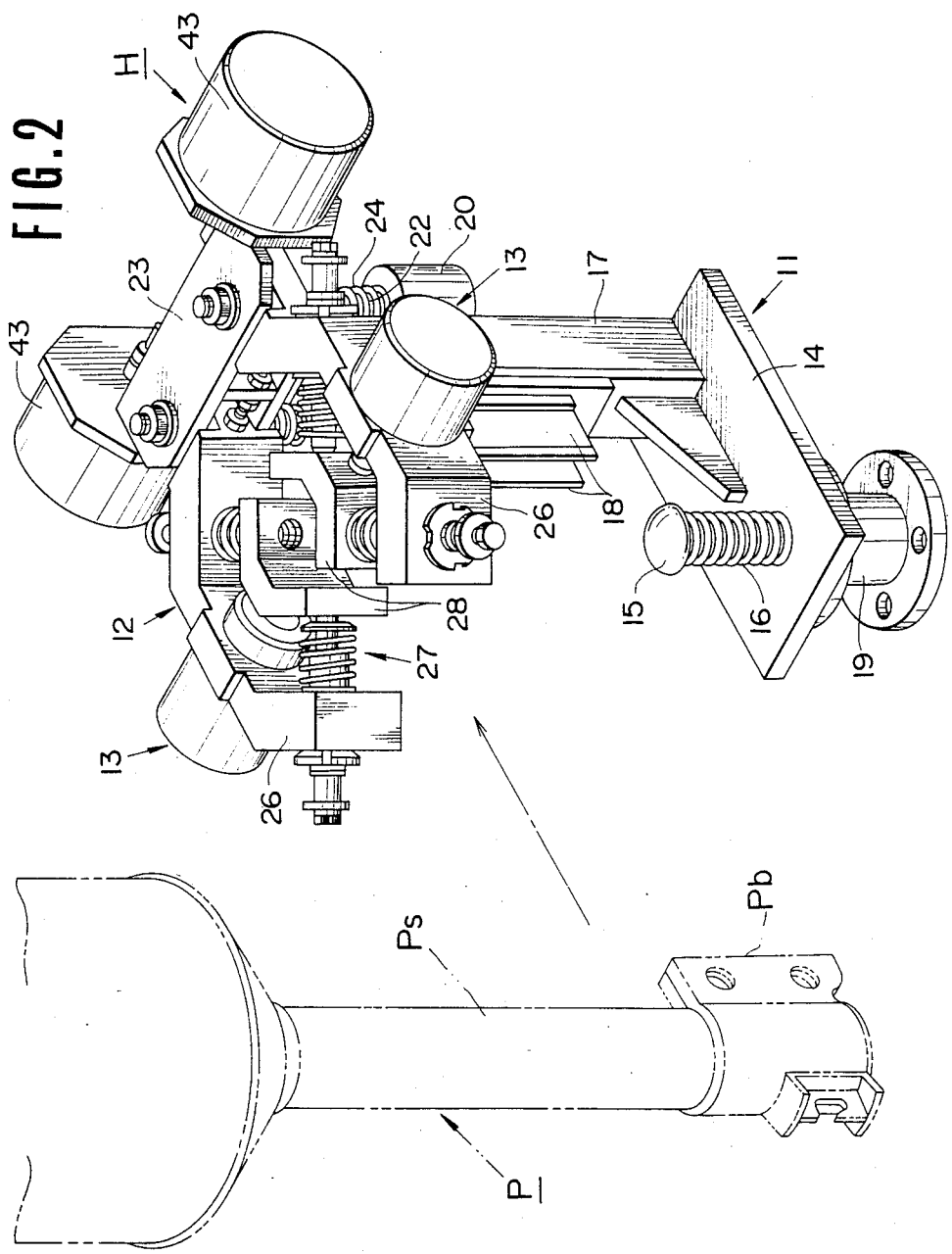
FIG. 2 is a perspective view of an example of a mechanical hand for grasping the sub-assembly used in the system for automatically attaching the sub-assembly to the main assembly shown in FIG. 1.
Figure 3:
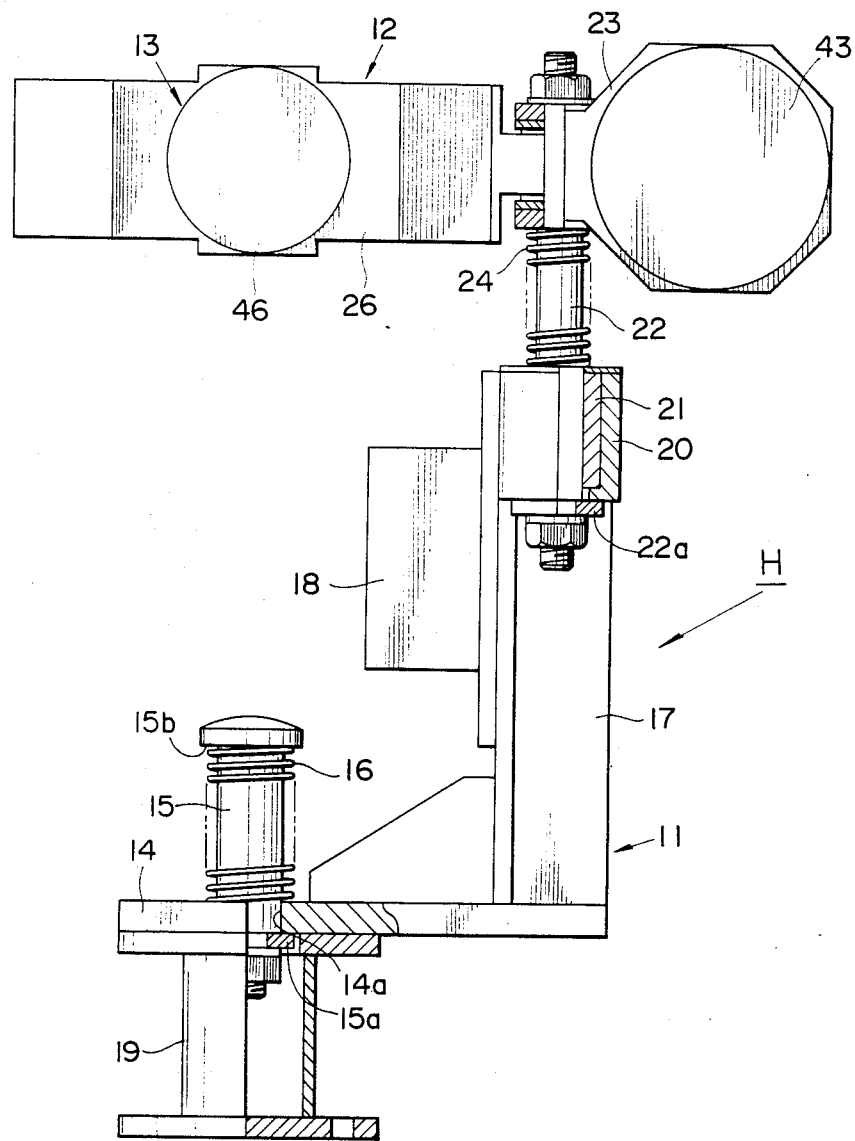
FIG. 3 is a partially sectioned front view of the mechanical hand shown in FIG. 2.
Figure 4:
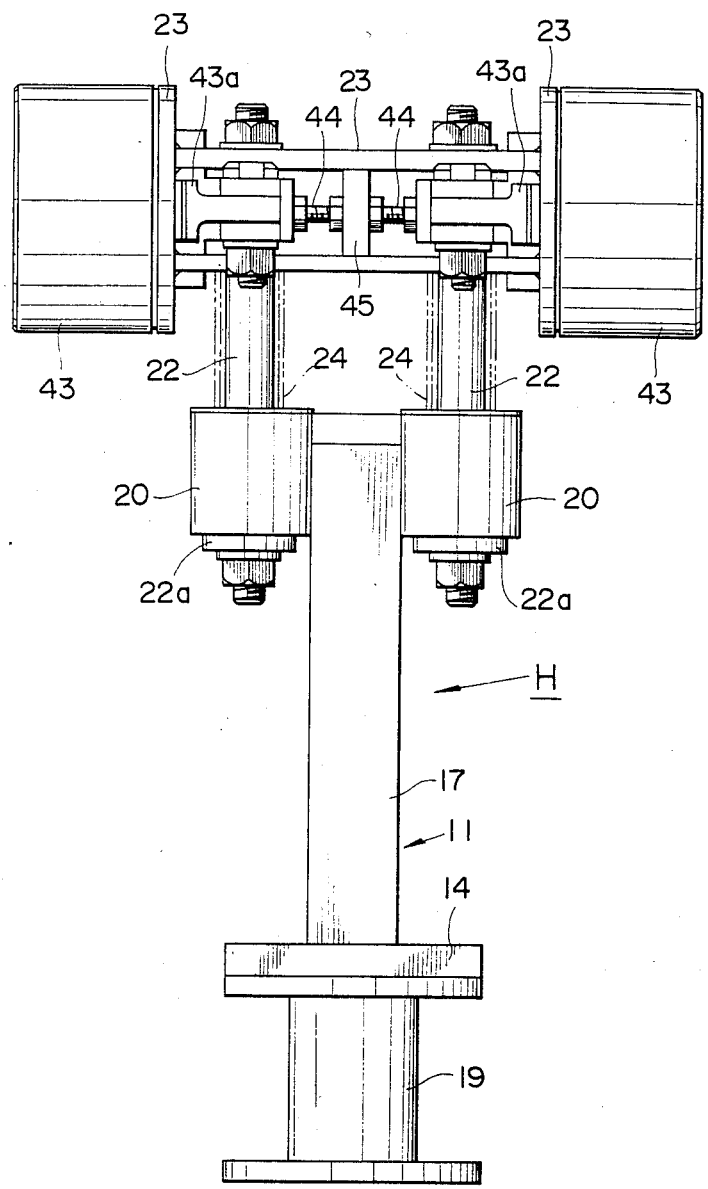
FIG. 4 is a partially sectioned right side view of the mechanical hand as viewed from FIG. 3.

The mechanical hand H, as typically shown in FIG. 2, comprises: (a) a main frame 11 fixed to a multi-articulated arm 10 of the first robot Ra; (b) a pair of clamping members 12, attached to the main frame 11, for grasping an axle Ps of the strut P so that the grasped axle Ps thereof becomes able to be passively float in a plane parallel to the upper surface of the strut tower 2 when the grasped strut P is attached to the strut tower 2 of the vehicle body B; and (c) a lock member 13 for fixing the pair of clamping members 12 in a closed state. The main frame 11 of the mechanical hand H comprises: (a) a flat base plate 14; (b) a bracket 19, provided at a lower position of the base plate 14, to which a multi-articulated arm of the first robot Ra is attached; (c) a supporting shaft 15, a lower end thereof being fitted into a hole 14a of the base plate 14 as shown in FIG. 3 so as to slide vertically with respect to the base plate 14 with the axial direction thereof being the same as that of the axle of the strut P when the axle Ps of the strut P is grasped by the pair of clamping members 12; (d) a stopper 15a provided at the lower end of the supporting shaft 15; (e) a spring 16 intervened between an upper flange 15b formed at an upper end of the supporting shaft 15 and base plate 14 for biasing the supporting shaft 15 upward with respect to the base plate 14; (f) a supporting pole 17 extended upward from the base plate 14 in parallel with the supporting shaft 15; (g) a pair of elongated plates 18 extended vertically from the supporting pole 17 toward the supporting shaft 15 and having a space therebetween so that a bracket Pb projected from the axle Ps of the strut P shown in the phantom lines of FIG. 2 is inserted into the space, thus preventing the axle Ps of the strut P from rotation; and (h) a pair of cylindrical housings 20 formed at both front and rear sides of an upper portion of the supporting pole 17 as viewed from FIG. 3, each cylindrical housing 20 including a ball bushing 21, supporting rod 22 extended upward from the corresponding cylindrical housing 20 via the ball bushing 21 so as to permit upward and downward sliding motions along the axial direction thereof, and a stopper 22a being provided at the lower end of each supporting rod 22. A bracket 23 is provided on both upper ends of supporting rods 22 for attaching the supporting rods 22 to the pair of clamping members 12. A pair of springs 24 are intervened between the bracket 23 and each of the cylindrical housings 20 so that both of the supporting rods 22 are biased upward with respect to the supporting pole 17.

The pair of clamping members 12 of the mechanical hand H comprises: (a) a pair of axles 25 inserted through the bracket 23 of the main frame 11; (b) a pair of movable arms 26, a portion of each movable arm 26 adjacent to one end thereof being pivotally fixed to the corresponding axle 25, which opens and closes angularly on each axle 25 as a fulcrum so as to approach toward or depart from each other along a plane parallel with the base plate 14; (b) a pair of floating mechanism 27 penetrating through each of the movable arms 26, one of the floating mechanisms 27 being located symmetrically with the other floating mechanisms 27 with respect to a center Po of the axle Ps of the strut P when the pair of clamping members 12 grasps the axle Ps of the strut P; (c) a pair of contacting plates 28, one located at a position in front of the corresponding movable 26 so as to face against the other contacting plate 28, each of the pair of floating mechanisms 27 being intervened between the corresponding movable arm 26 and contacting plate 28.

Figure 5:
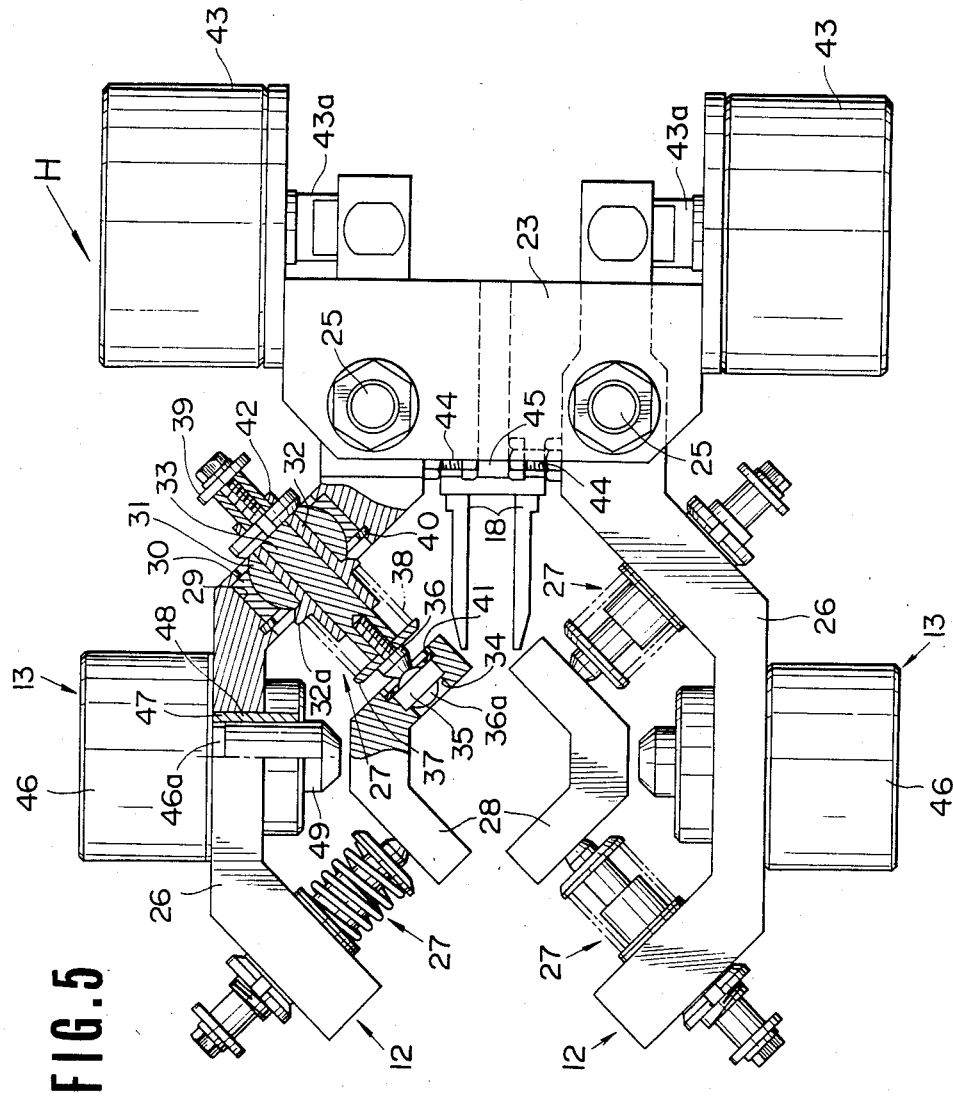
FIG. 5 is a partially sectioned top view of the mechanical hand shown in FIGS. 2 through 4.
Figure 6:
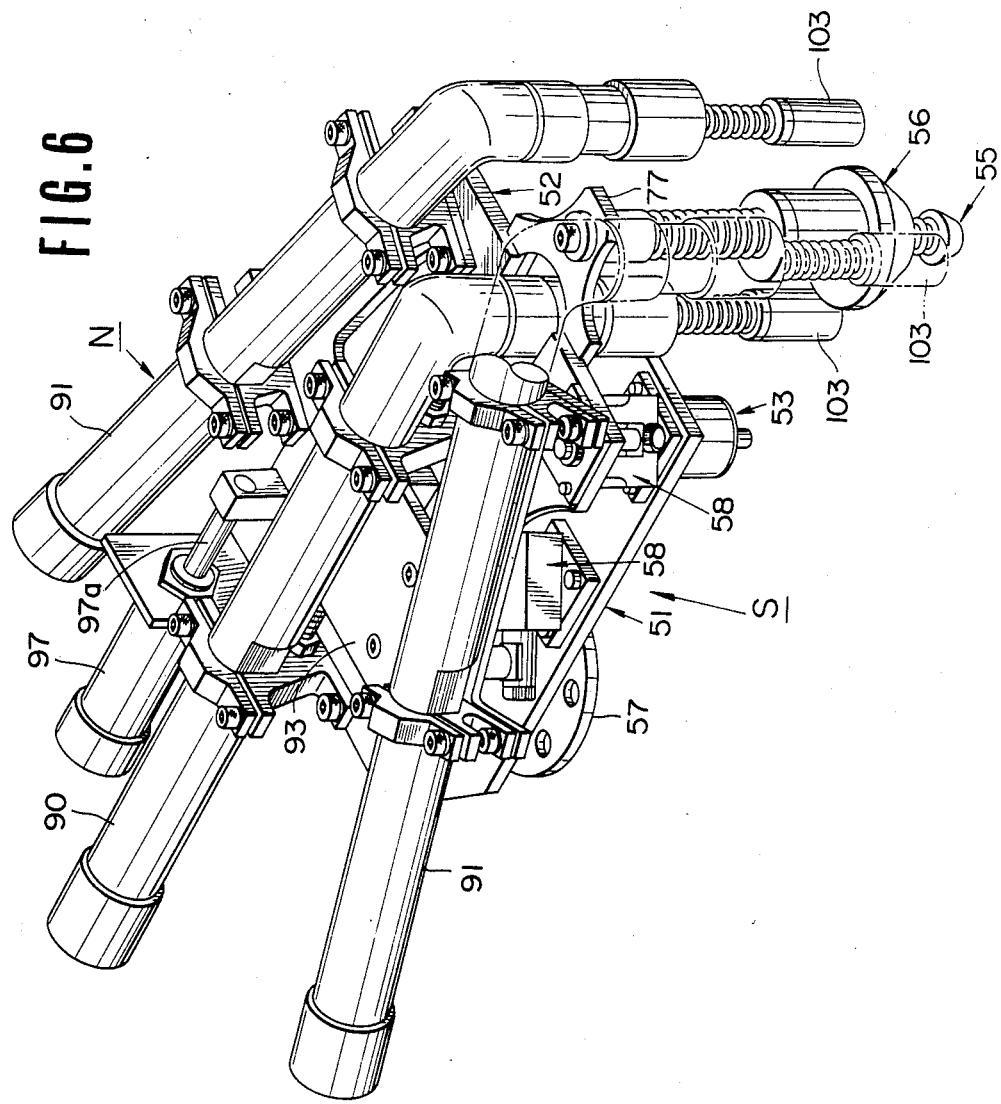
FIG. 6 is a perspective view showing an example of a supporting apparatus supporting an automatic fastening tool used in the system for automatically attaching the sub-assembly to the main assembly shown in FIG. 1.

It should be noted that each movable arm 26 has a shape in section such that both tips of arm portions extends substantially at angles of 45° from opposite ends of a base portion and, similarly, each contacting plate 28 has a shape in section such that both tip of arm portions extends substantially at angles of 45° from opposite ends of a base portion, as typically shown in FIG. 5. It should also be noted that each floating mechanism 27 is provided between the corresponding arm portion of each movable arm 26 and contacting plate 28 and all of the floating mechanisms 27 are disposed at each interval of distance of 90° toward the center Po of the axle Ps of the strut P supposing that the axle Ps of the strut P is grasped with the pair of clamping members 12. Each floating mechanism 27 comprises: (a) a spherical bearing 30 fitted into a hole 29 provided at each corresponding movable arm 26; (b) a sleeve 32 slidably supported by the spherical bearing 30 via a hollow of a spherical axle 31; (c) a sliding rod 33 inserted into the sleeve 32 so as to slide along the sleeve 32; (d) another spherical bearing 35 fitted into a hole 34 provided at the corresponding contacting plate 28; (e) a link 36 supported by the spherical bearing 35 via another spherical axle 36a; (f) a washer 37 attached to one end of the sliding rod 33 which faces toward the corresponding contacting plate 28; (g) a spring 38 intervened between a flange 32a integrally formed at the sleeve 32 and the washer 37 which biases the corresponding sliding rod 33 toward the axial center Po of the strut P when the axle Ps of the strut P is grasped; and (h) another washer 39 provided at the other end of the sliding rod 33 for limiting a movable distance of the sliding rod 33 toward the axial center Po of the strut P by contacting one end of the sliding rod 33. Each floating mechanism 27 further comprises: (a) snap rings 40 and 41, each of which fixes the corresponding spherical bearing 30 and 35 to the inner wall of the hole 29 of the movable arm 26; and (b) a lock nut 42 which fixes the sleeve 32 to the hole 29 of the movable arm 26.

On the other hand, a pair of pneumatic cylinders 43 are attached to the above-described bracket 23, each pneumatic cylinder 43 having a piston rod 43a linked with the end of the arm portion adjacent to the corresponding axle 25 of the corresponding movable arm 26, which pushes or pulls the piston rod 43a so that the corresponding movable arm 26 is pivotted on the corresponding axle 25 as a fulcrum. Consequently both movable arms 26 angularly opens when the piston rods 43a are pushed toward each other from the corresponding pneumatic cylinders 43. Furthermore, both movable arms 26 are provided with bolts 44 having threaded portions, tip ends thereof fastened with corresponding nuts as seen from FIG. 5, in the vicinity of the axles 25, respectively. One of the bolts 44 is projected from the corresponding movable arm 26 toward a stopper piece 45 provided at the bracket 23 and located at a position opposite to the other bolt 44 projected from the corresponding other movable arm 26. Both bolts 44 serve to limit a closed position of both movable arms 26 by contacting with the stopper piece 45 of the bracket 23.

Each lock member 13 of the mechanical hand H comprises: (a) a pneumatic cylinder 46 located outside of the corresponding movable arm 26 having a piston rod 46a which operatively extends toward the axial center Po of the grasped strut P; (b) an inserting hole 47 provided at the corresponding movable arm 26 through which the piston rod 46a is movably inserted; and (c) an adaptor 49 linked with an extended end of the piston rod 46a and inserted through the inserting hole 47 via a bearing 48. When both piston rods 46a are extended toward the corresponding contacting plates 28 by means of the corresponding pneumatic cylinders 43, both of the adapters 49 are brought in close contact with surfaces of the respectively corresponding contacting plates 28 spaced apart from the respectively corresponding movable arms 26. Consequently, both contacting plates 28 are pressed toward the axle Ps of the strut P so as to tightly grasp the axle Ps of the strut P to prevent the strut P from being able to float passively.

Next, the construction of a first example of the supporting apparatus S of the nut fastening tool N will be described with reference to FIGS. 6 through 10.

The supporting apparatus S comprises: (a) a flat base plate 51 fixed to a mult-articulated arm 50 of the second robot Rb; (b) a movable plate member 52 supported on the base plate 51 so as to permit a floating movement thereof in a plane parallel with the upper surface of the strut tower 2 shown in FIG. 1 when the strut P is attached to the strut tower 2 of the vehicle body B; (c) a pair of lock members 53 which lock the movable plate member 52 at an arbitrary position as will be described later; (d) a pair of lock mechanisms 53' which locks the above-described movable plate member 52 at a predetermined fixed position as will also be described later; (e) an engagement member 55 which operatively engages an engaging hole 54 provided at the upper casing 4 of the strut P grasped by the mechanical hand H described above; and (f) a guide member 56 linked with the movable plate 52 which operatively engages the positioning hole 3 located at the upper surface of the strut tower 2 of the vehicle body B shown in FIG. 1 in such a way that an axis of the guide member 56 is positively moved toward a center of the positioning hole 3 with the movable plate member 52 being float with respect to the base plate 51. It should be noted that the nut fastening tool N is secured to the movable plate 2.

The supporting apparatus S further comprises: (a) a bracket 57 located below the base plate 51 to link with the arm 50 of the second robot Rb; and (b) a plurality of preferably four floating mechanisms 58 located between the base plate 51 and movable plate member 52, the movable plate member 52 being supported via the floating mechanisms 58 on the base plate 51. Each floating mechanism 58, as typically shown in FIG. 7 and FIG. 10, comprises: (a) a bearing 59 provided within a hole 51a of the base plate 51; (b) a rotating shaft 60 fitted into the hole 51a of the base plate 51 via the bearing 59; (c) a casing 61 fixedly linked with one end of the rotating shaft 60; (d) a sliding shaft 62 which operatively slides along a plane parallel with that of the base plate 51; (e) another bearing 63 provided within a hole 52a of the movable plate member 52; and (f) a linkage shaft 64 one end thereof being fixedly linked with one end of the sliding shaft 62 and the other end thereof being fitted into the hole 52a of the movable plate member 52 via the bearing 63. The movable plate member 52 can, thus, float toward an arbitrary direction maintaining a parallel positional relationship with respect to the base plate 51. Each floating mechanism 58 further comprises (a) a coil spring 62a located at the other end of the sliding shaft 62; (b) a plate 65 for depressing the bearing 63; and (c) collar 66 located above the bearing 63.

The pair of lock members 53 of the supporting apparatus S comprise magnet brakes for applying the braking to the rotation of the rotating shaft 60 constituting each of the floating mechanisms 58. Each magnet brake comprise: (a) a cylindrical electromagnet 67 fixed to the lower surface of the base plate 51 and through which the rotating shaft 60 of each corresponding floating mechanism 58 is rotatably inserted; and (b) a coupling 68 provided at the lower surface of the cylindrical electromagnet 67 and fixedly linked with the other end of the rotating shaft 60. When the cylindrical electromagnet 67 is deenergized, the above-described coupling 68 is disposed with a substantially 0.2 mm spaced apart from the cylindrical magnet 67 so that the rotating shaft 60 can freely be rotated. Whereas, when the cylindrical electromagnet 67 is energized, the coupling 68 is attracted to the cylindrical electromagnet 67 so that the rotation of rotating shaft 60 is locked. Accordingly, the positions of the casing 61, sliding shaft 62, and linkage shaft 64 are determined automatically and thus the movable member 52 is fixed at a predetermined position. The pair of lock mechanisms 53' comprises, as typically shown in FIG. 8 (a) a pair of horn-shaped locative holes 69 provided at predetermined positions of the movable member 52 each spaced apart from a substantially center position of the movable plate member 52 and each having an inverted cylindrical truncated cone shaped section in which one inner diameter facing toward the base plate 51 is larger than the other inner diameter of a cylindrically shaped section facing toward the nut fastening tool N; (b) a pair of horn-shaped locative pins 70 located at predetermined positions spaced apart from the substantially center position of the movable plate 52 which operatively fit into the horn-shaped locative holes 69.

Each of the above-described lock mechanisms 53' further comprises: (a) a bracket 71 provided at a center portion of the base plate 51; (b) a pneumatic cylinder 72 fixed to the center portion of the base plate 51 by means of a bolt 71a so that a piston rod 72a thereof can be extended upward and downward with respect to the base plate 51; (b) an adaptor 73 attached to a tip of the piston rod 72a; (c) a supporting plate 74 attached to the piston rod 72a of the pneumatic cylinder 72 via the adaptor 73 and extending horizontally along the movable plate 52 for fixedly supporting the pair of locative pins 70; (d) a substantially cylindrical shaped guide bracket 75 fixed to the pneumatic cylinder 72 into which the adaptor 73 is slidably fitted; (e) two rotation locking plates 76 fixed to the front and rear portions of the supporting plate 74 and always contacting with flat contacting surfaces 75a formed by cutting out the front and rear portions of the guide bracket 75, so that the supporting plate 74 moves upward and downward straightly without spiral rotation and the locative pins 70 are positioned so as to enable upward and downward movement at positions corresponding to the respective locative holes 69 of the movable member plate 52.

Each of the locative pins 70 comprises circular truncated cone shaped section which operatively fits into the corresponding locate holes 69 and circular cylinder section extended upward from the circular truncated cone shaped section. Therefore, when the piston rod 72a of the pneumatic cylinder 72 is extended upward from the pneumatic cylinder housing, the circular truncated cone shaped sections of the pair of locative pins 70 are brought in close contact with the corresponding locative holes 69 so that the movable plate member 52 is maintained at a given position with respect to the base plate 51. On the other hand, when the extended piston rod 72a of the pneumatic cylinder 72 is pulled toward the pneumatic cylinder 72, the circular cylinder sections of the locative pins 70 become loosely fitted into the inverted truncated cone shaped sections of the locative holes 69. It should be noted that the above-described supporting plate 74 is provided with two bolts 85 extending toward the movable plate member 52 for adjusting the relative position of the respective locative pins 70 to the locative holes 69 of the movable plate member 52.

Figure 7:
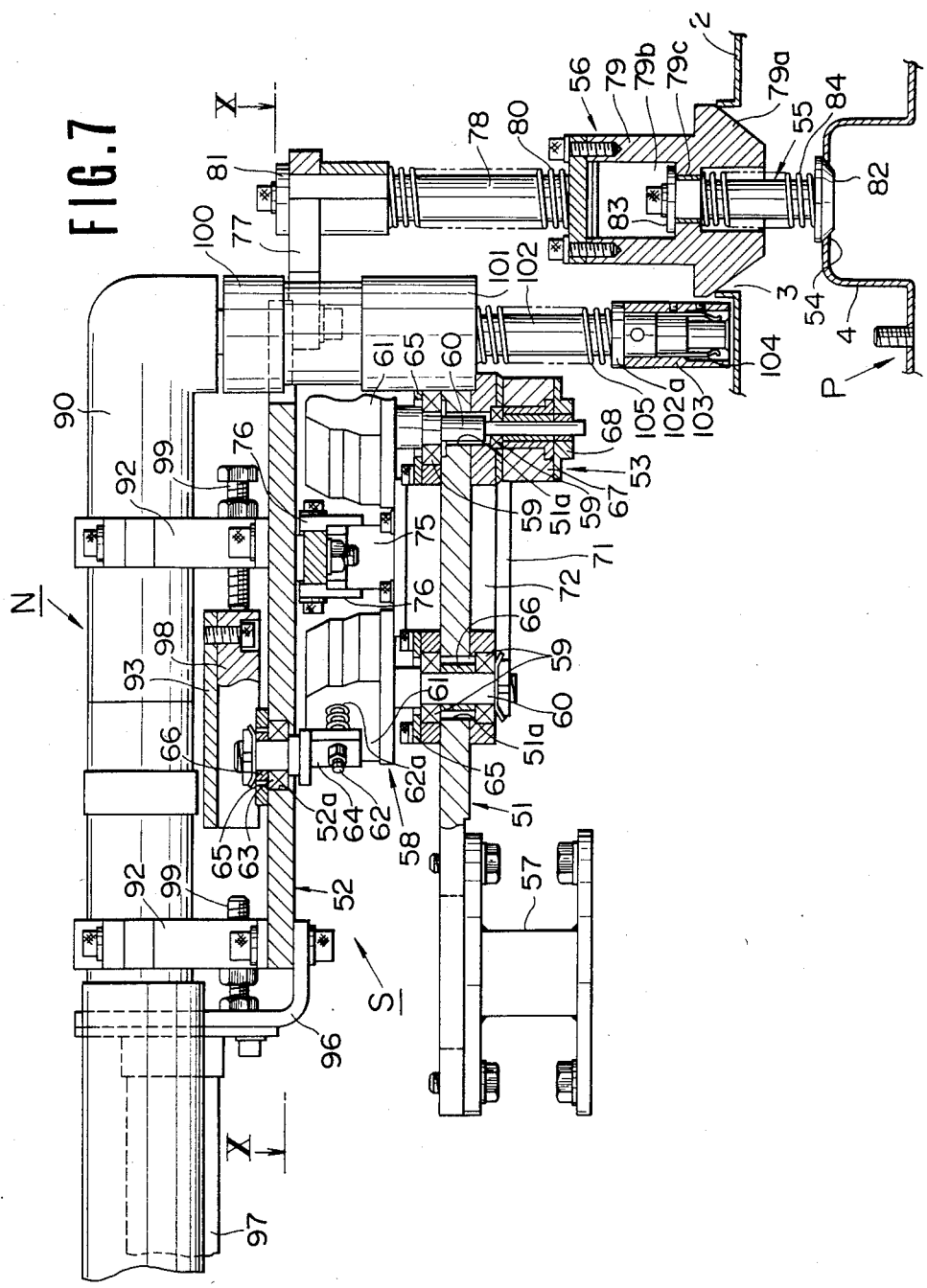
FIG. 7 is a partially sectioned front view of the supporting apparatus shown in FIG. 6.
Figure 8:
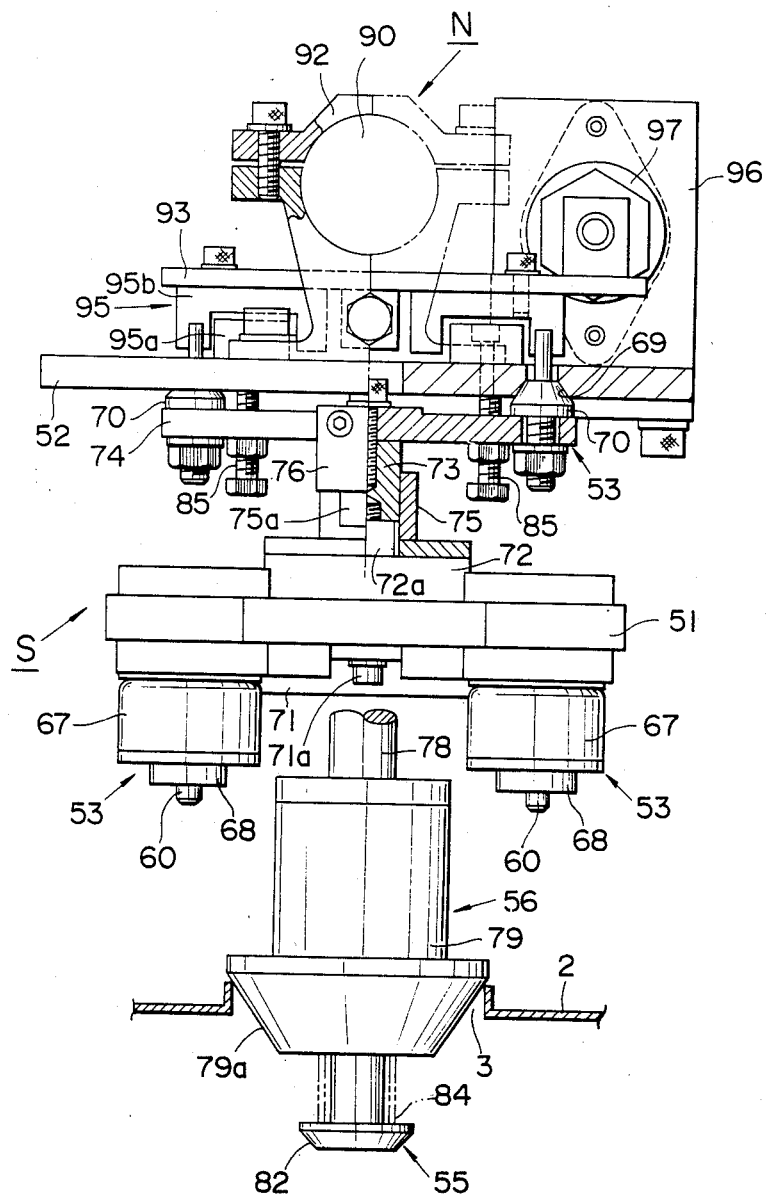
FIG. 8 is a partially sectioned right side view of the supporting apparatus as viewed from FIG. 7.

Furthermore, the above-described guide member 56 in this supporting apparatus S, as typically shown in FIG. 7, comprises: (a) a guide bracket 77 attached to the movable plate 52; (b) a sliding shaft 78 an upper end thereof being fixed to the guide bracket 77 which can slide vertically with respect to the movable plate member 52; (c) a guide rod 79 having an inverted circular truncated cone-shaped guide tapered portion 79a; (d) a spring 80 intervened between an upper end of the guide rod 79 and bracket 77 for biasing the guide rod 79 downward. As shown in FIG. 8, a lock washer 81 is provided at the upper end of the sliding shaft 78. The guide rod 79 is provided with a hollow 79b having an opening at the lower end thereof. The engagement member 55 having an engagement section for engaging an engagement hole 54 formed at the upper casing 4 of the strut P is incorporated into the hollow 79b of the guide rod 79 through the opening thereof coaxially with the guide member 56, i.e., sliding shaft 78. The engagement section of the engagement member 55 is an engagement tapered portion 82 in the form of an inverted circular truncated cone.

The engagement member 55 in this supporting apparatus S comprises: (a) a lock washer 83 engaged with a step 79c formed at the opening of the hollow 79b for securing an upper end of a sliding shaft 55 to a lower wall of the hollow 79b; and (b) a spring 84 intervened between the step 79c and engagement tapered portion 82 for always biasing the engagement tapered portion 82 downward with respect to the movable plate member 52. The engagement tapered portion 82 of the engagement member 55 is, thus, always extruded downward from the guide rod 79 of the guide member 56.

On the other hand, the nut fastening tool N supported by the above-described supporting apparatus S comprises: (a) a stationary-type nut runner 90; and (b) a pair of movable-type nut runners 91. These nut runners 90 and 91 are provided corresponding to the maximum number of bolts 6 projected from the strut P. The stationary-type nut runner 90 is directly fixed to the movable plate member 52 via holding brackets 92 and while the pair of the movable-type nut runners 91 are arranged symmetrically along the stationary-type nut runner 90 and fixed on a sliding plate 93 which can slide toward the left and right directions with respect to the movable plate member 52 shown in FIG. 9 via a holding bracket 94. A slide mechanism 95 for the sliding plate 93 comprises:, as typically shown in FIG. 8, (a) an inner casing 95a fixed on the movable plate member and (b) an outer casing 95b fixed on the sliding plate 93 slidably fitted into the inner casing 95a. The sliding plate 93 is, as typically shown in FIG. 9, linked with a piston rod 97a of a pneumatic cylinder 97 attached to the movable member plate 52 via a bracket 96 so as to slide the sliding plate 93 toward the left and right directions with respect to the movable plate member 52 according to the stroke of the piston rod 97a. On the other hand, the sliding plate 93 is stopped by means of a stopper plate 98 typically shown in FIG. 7 fixed at a lower surface of the sliding plate 93 which is contacted with either of adjusting bolts 99 each provided at one of the holding brackets 92. Therefore, the relative positions of the pair of movable-type nut runners 91 with respect to the stationary-type nut runner 90 are changed according to the stopped position of the sliding plate 93 as as to follow the change in the positions of the bolts 6 at which the nuts are fastened dependent upon models of the vehicle.

Figure 9:
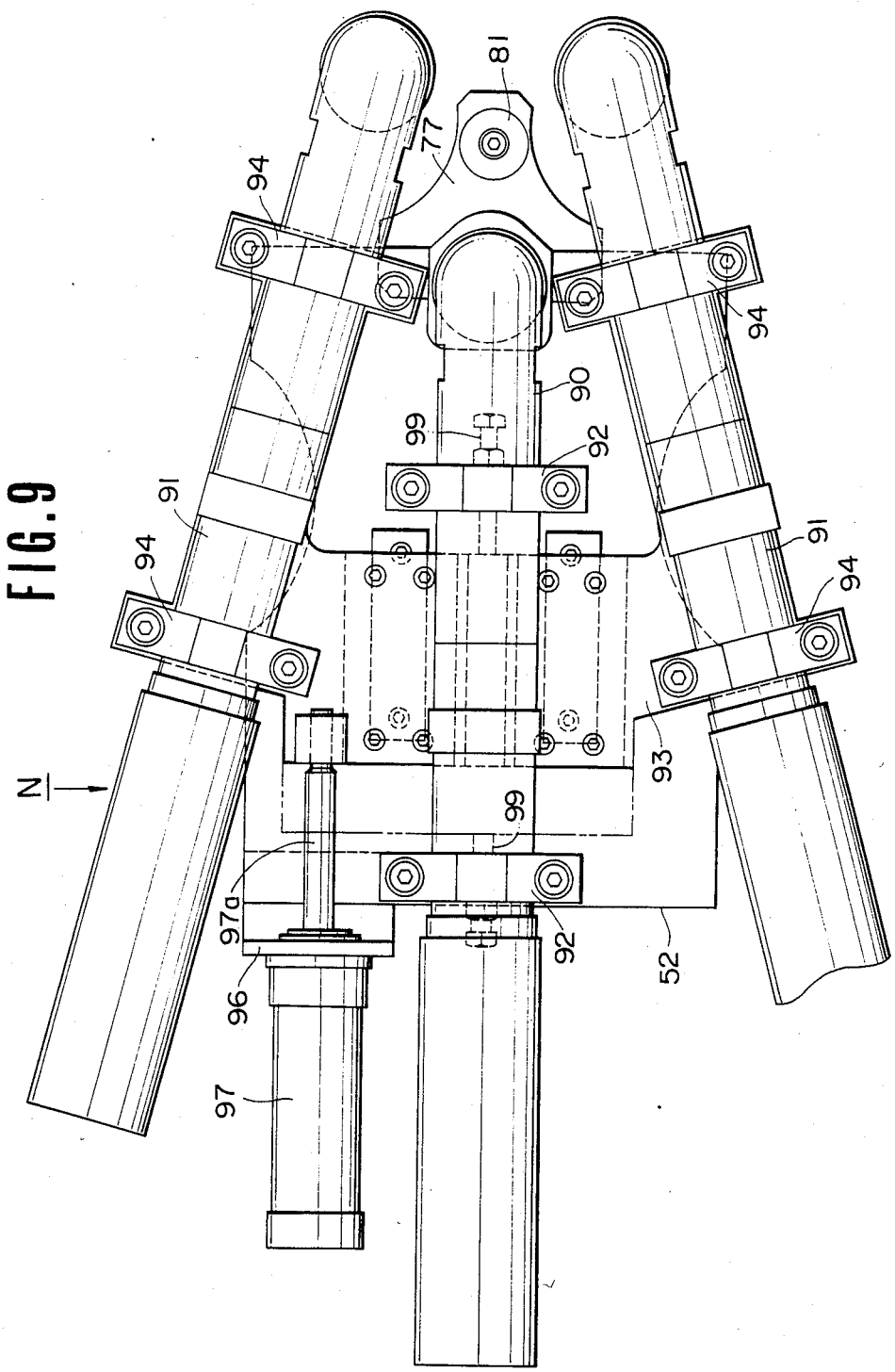
FIG. 9 is a top view of the supporting apparatus shown in FIGS. 6 through 8.
Figure 10:
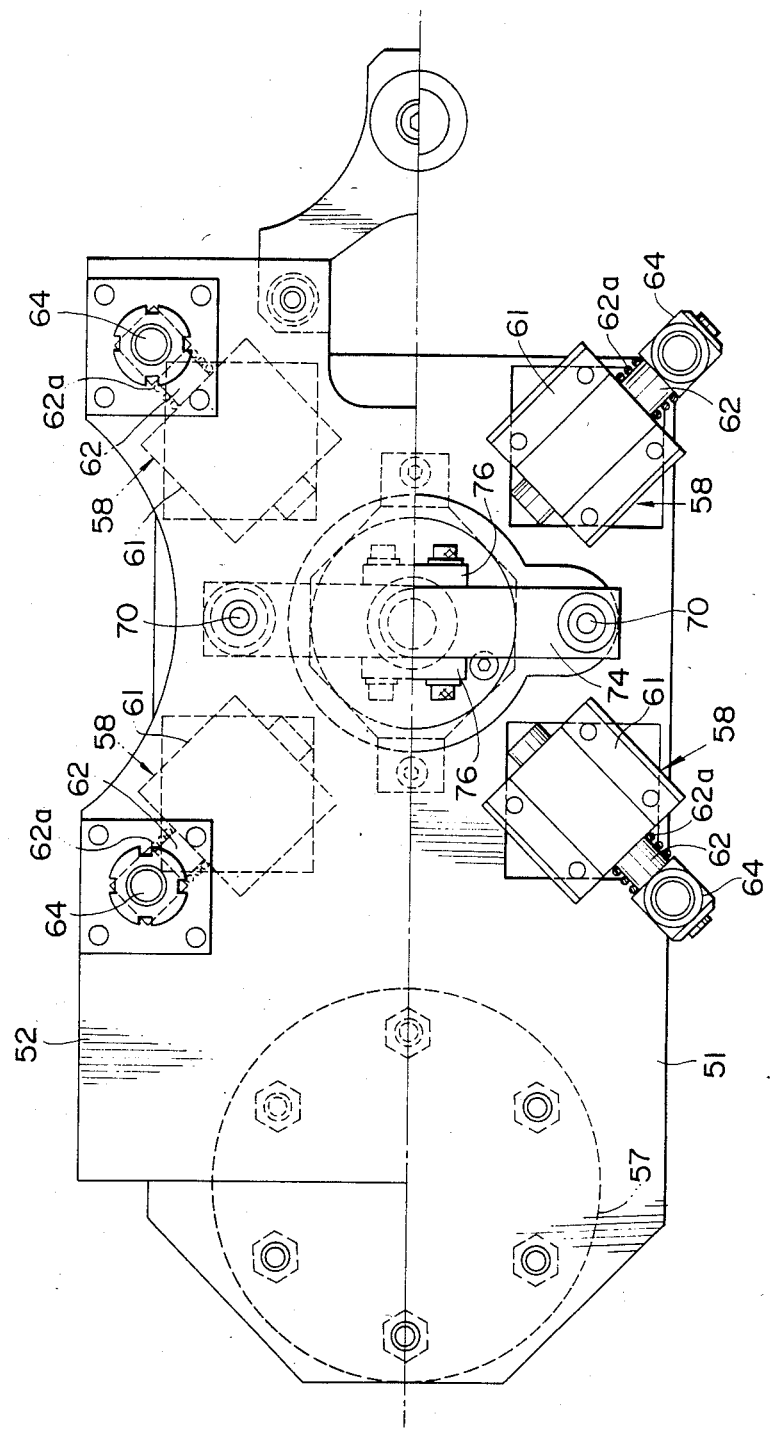
FIG. 10 is a partially sectioned view of the supporting apparatus taken along the line X—X in FIG. 7.

In other words, for a model of a vehicle wherein the number of bolt inserting holes 5 of the vehicle body B are three as shown in FIG. 1, the pair of the movable-type nut runners 91 may be disposed as shown in FIG. 9 and the pair of movable-type nut runners 91 may be disposed toward the left direction by means of the sliding plate 93 indicated in a phantom line of FIG. 9 and the nut fastening operation may be carried out by means of only the pair of movable-type nut runners 91 in a case when the number of bolt inserting holes 5 of the vehicle body B is two.

As typically shown in FIG. 7, a coupling 100 is fixed to a rotating axis of each of the stationary-type and movable-type nut runners 90 and 91 and a joint 101 is also fixed thereto at a lower end of the coupling 100. A linkage shaft 102 is attached between each hole of the joint 101 and coupling 100 so that the linkage shaft 102 is slidable along the upward and downward directions with respect to the movable plate member 52 and is not spirally rotatable on its axis. A nut holding socket 103 is fitted into a lower portion of the linkage shaft 102. A flat spring 104 is provided within the nut holding socket 103 which grasps a nut, typically a hexagonal nut. A spring 105 is intervened between a lower end of the joint 101 and a flange 102a provided at the lower end of the linkage shaft 102 so that the linkage shaft 102 is always biased downward with respect to the movable plate member 52.

An operation of the preferred embodiment of the system of the construction described hereinabove will be described hereinbelow with respect to FIG. 11 through FIG. 19 and FIG. 22(a) through FIG. 22(e).

Figure 11:
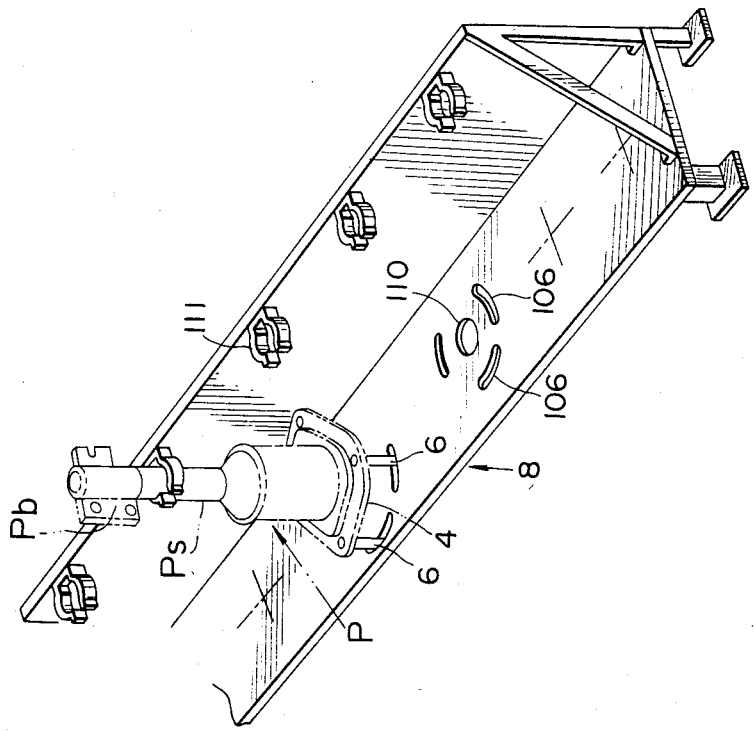
FIG. 11 is a perspective view of an example of a bin shown in FIG. 1 on which a plurality of struts are aligned to prepare for the process of automatically attaching struts to the respective vehicle bodies.
Figure 12:
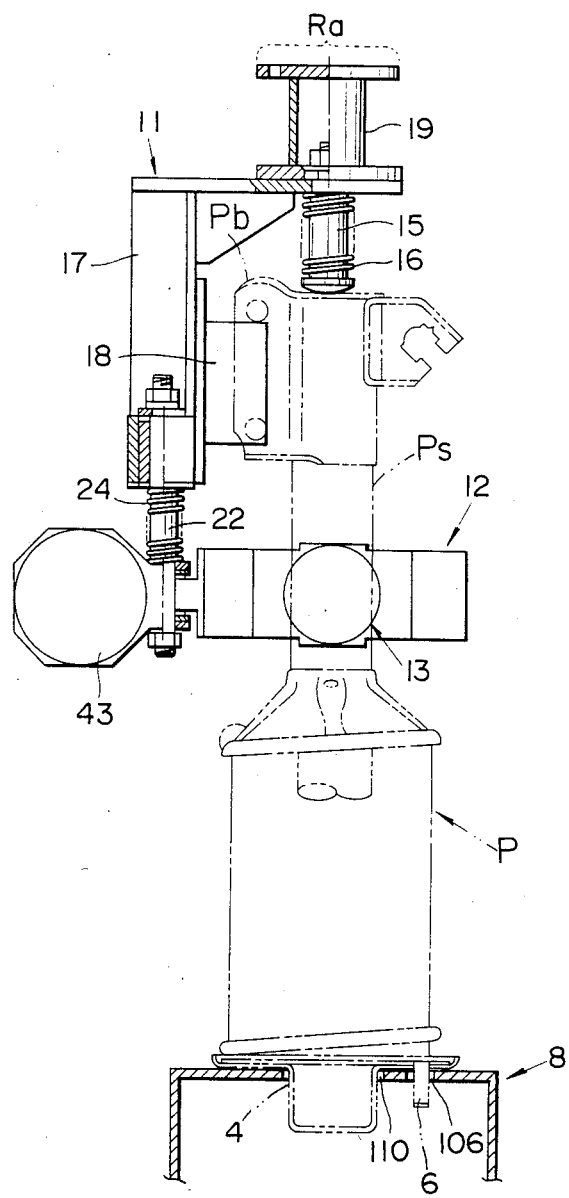
FIG. 12 is a partially sectioned view of the mechanical hand in a situation where the mechanical hand grasps one of the struts disposed within the bis shown in FIG. 11.

At first, the first robot Ra actuates the mechanical hand H, i.e., the pair of clamping members 12 to grasp one of the struts P mounted within the bin 8, as typically shown in FIG. 11, and waits the vehicle body B to be transported by the conveyor belt 1 at a position which does not interfere with the transported vehicle body B in accordance with preprogrammed position instructions issued by a control unit (not shown). In more detail, in a first step SP$_1$, the piston rods 43a of the pair of pneumatic cylinders 43 are extruded by means of the pneumatic cylinders 43 so that the pair of clamping members 12 are pivoted on their respective axles 25 to set the pair of contacting plates 28 an angularly open clampable state. In a second step SP$_2$, the first robot Ra moves the mechanical hand H toward the bin 8 at which the main frame 11 is inverted so that a bottom portion of the strut P is contacted with the supporting shaft 15 and thereafter the first robot Ra is stopped, with the biasing force of the spring 16 balancing the weight of the strut P. In a third step SP$_3$, the piston rods 43a of the pair of pneumatic cylinders 43 are, in turn, pulled into the respective pneumatic cylinders 43 so that the pair of clamping arms 26 are pivotted on their respective axles 25 to set the pair of contacting plates 28 in an angularly closed state. Therefore, the contacting plates 28 are brought in close contact with the axle Ps of the strut P. Thereafter, the piston rods 46a of the pair of pneumatic cylinders 46 constituting the lock members 13 are extruded from their respective cylinders 46 so that each adaptor 49 is brought in contact with the outside surface of the corresponding contacting plate 28. Therefore, the contacting plates 28 are brought in close contact with the axle Ps of the strut P so as to assure the tight grasping of the strut P by means of the pair of clamping members 12. In a fourth step SP$_4$, the arm 10 is rotated through a predetermined angle, for example, 30°, as shown in FIG. 11 and FIG. 12. At this time, since the bracket Pb of the strut P is fitted into the space between the pair of plates 18 located at the supporting pole 17, the rotating force of the arm 10 being transmitted to the strut P. On the other hand, since the bolts 6 projected from the upper portion of the strut P are fitted into respective positioning slots 106 provided within the bin 8 as shown in FIG. 11, the whole strut P is rotated accordingly while the bolts 6 are moved within the respective positioning slots 106. After the bolts 6 are contacted with their ends of the positioning slots 106, the axle Ps of the strut P only is rotated continuously with the pair of contacting plates 28 gasping the axle Ps of the strut P and the upper casing 4 of the strut P stops its rotation. Therefore, a relative position of the bolts 6 to the first robot Ra is automatically determined. In a next step SP$_5$, the first robot Ra takes out the strut P from the bin 8 and sets the strut P at a predetermined position beside the conveyor belt 1 to wait the vehicle body B for arriving at a predetermined stopped position.

It should be noted that in FIG. 11 and FIG. 12 numeral 110 denotes an opening into which each upper casing 4 of the struts P is fitted and numeral 111 denotes a clip member for clipping each axle Ps of the strut P temporarily.

On the other hand, as shown in FIG. 1, the second robot Rb instructs the nut feed 9 to prepare for feeding a predetermined number of nuts 7 into the nut fastening tool N and also waits the vehicle body B to which the strut P is to be attached at a position which does not interfere with the transportation of the vehicle body B by means of the conveyor belt 1. In more detail, in a first step SP$_1'$, the control unit (not shown) sends to the second robot Rb a selective signal indicating a model of the vehicle relating to the vehicle body B to which the strut P is attached. In this embodiment, the number of bolts 6 are three. The pair of the movable-type nut runners 91 are moved properly by means of the sliding plate 93 so as to be placed at a position according to the model of the vehicle since the position and number of bolt inserting holes 5 and bolts 6 are different depending on the vehicle model. In a next step SP$_2'$, the positioning of the nut fastening tool N with respect to the second robot Rb is performed in such a way that the piston rod 72a of the pneumatic cylinder 72 is extruded from the pneumatic cylinder 72 so that the locative pins 70 on the supporting plate 74 are tightly fitted into the locative holes 69 on the movable plate member 52. In a next step SP$_4'$, the second robot Rb carries the nut fastening tool N to the nut feed 9 to hold the nuts 7 within the respective sockets 103. The second robot Rb thereafter moves the nut fastening tool N toward a predetermined position beside the conveyor belt 1 to wait for the transported vehicle body B to which the strut P is attached.

Subsequently in a step SP$_6$, the vehicle body B is stopped at the predetermined stopped position. At this time, the control unit (not shown) sends a stop completion signal indicating that the vehicle has stopped to both first and second robots Ra and Rb. As shown in FIG. 13, in a step SP$_7$, the first robot Ra carries the strut P grasped by the mechanical hand H toward the strut tower 2 of the stopped vehicle body B in such a way that the bolts 6 extended from the upper casing 4 of the strut P face upward against a lower portion of the strut tower 2 of the stopped vehicle body B, while, in a step SP$_7'$, the second robot Rb carries the nut fastening tool N straightly above an upper portion of the strut tower 2. In this state, both the strut P and nut fastening tool N are accurately stopped at their corresponding predetermined positions sandwiching the vehicle body B on a basis of the accuracies of both first and second robots Ra and Rb. It should be noted that since the accuracy of the stopped position of the vehicle body B is lower than those of both first and second robots Ra and Rb, the positioning hole 3 of the strut P is usually deviated toward a front or rear position along the running direction of the conveyor belt 1 on which the vehicle body B is transported with respect to the stopped positions of the strut P and nut fastening tool N by means of the respective robots Ra and Rb.

Figure 14:
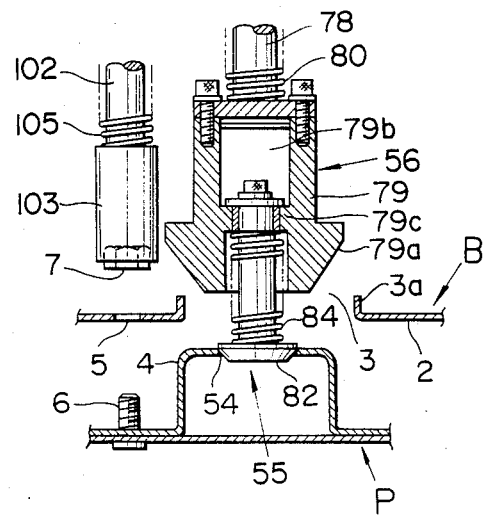
FIG. 14 is an essential part sectioned explanatory view showing that an engagement member of the supporting apparatus is engaged with an engagement hole provided at an upper portion of the strut grasped by the mechanical hand.

The second robot Rb, in a step SP$_8'$, as shown in FIGS. 13 and 14, moves the nut fastening tool N downward together with the supporting apparatus S and stops at a position which the guide tapered portion 79a of the guide member 56 approaches the flange 3a provided at the edge of the positioning hole 3. On the other hand, in a step SP$_8$, the first robot Ra moves the strut P upward until a predetermined position is reached. At this time, the engagement member 55 of the supporting apparatus S is located at a position lower than the positioning hole 3 passed through the positioning hole 3. In a step SP$_9$, the engagement tapered portion 82 of the engagement member 55 is fitted into the engagement hole 54 of the upper casing 4 of the strut P and the engagement member 55 is pushed slightly upward against the biasing force of the spring 84 as shown in FIG. 14. In a next step SP$_{10}$, the first robot Ra stops. In this way, the relative positioning of the strut P to the nut fastening tool N is completed. It should be noted that, at this time, the nuts 7 held by means of the sockets 103 of the nut runners 90 and 91 are placed at positions deviated from the bolt inserting holes 5 of the vehicle body B due to the low accuracy of the stopped position of the vehicle body B.

Next, the positioning of the fastening tool N and strut P relative to the vehicle body B is carried out.

In more detail, the control unit (not shown) sends to the first robot Ra an engagement end signal indicating that the engagement of the hole 54 of the strut P with the engagement member 55 of the nut fastening tool N has completed. The first robot Ra then, in a step SP$_{11}$, actuates the pair of lock members 13 of the mechanical hand H to unlock the pair of contacting plates 28 as appreciated from FIG. 5. In other words, the piston rods 46a of the pair of pneumatic cylinders 46 are simultaneously intruded into their respective pneumatic cylinders 46 so that the respective adaptors 49 are separated from the corresponding contacting plates 28. Therefore, the strut P grasped by the pair of clamping members 12 at the axle Ps thereof is floatingly supported by the four floating mechanisms 27 in the radial direction from each floating mechanism 27 to the center Po of the axle Rs of the strut P and in the upward and downward directions along the axle Rs of the strut P.

On the other hand, in a step SP$_{11}'$, the second robot Rb also receives the engagement end signal from the control unit (not shown) and the pair of locking mechanisms 53' of the supporting apparatus S are actuated to unlock the movable plate member 52.

Figure 15:
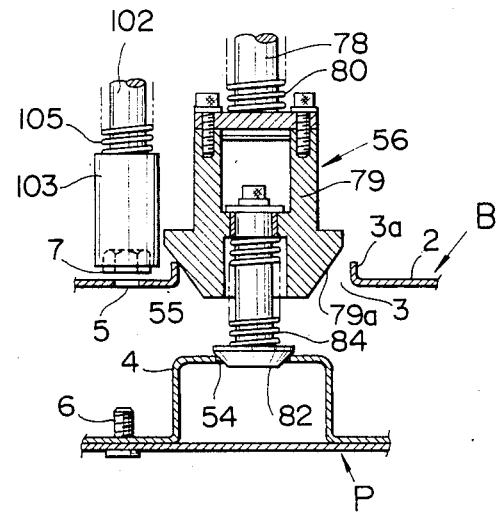
FIG. 15 is an essential part sectioned explanatory view showing that a guide tapered portion of a guide member of the supporting apparatus is brought in contact with a flange of a positioning hole provided at a strut tower of vehicle body.
Figure 16:
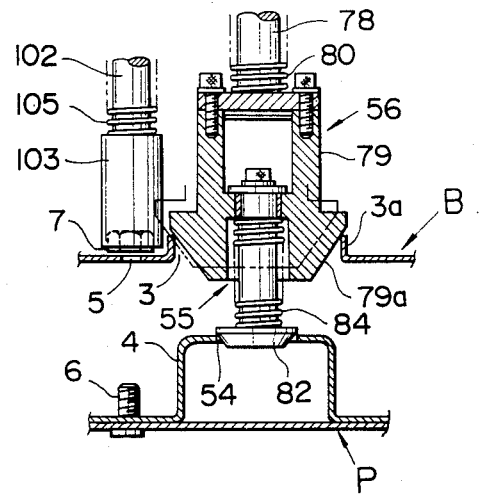
FIG. 16 is an essential part sectional explanatory view showing that the guide tapered portion is completely fitted into the positioning hole of the strut tower.

In other words, the piston rod 72a of the pneumatic cylinder 72 is pulled into the pneumatic cylinder 72 by the actuation of the second robot Rb in response to the engagement end signal described above so that the locative pins 70 are moved downward according to the down stroke of the piston rod 72a. Therefore, the circular cylinder portions of the locative pins 70 are located at the corresponding locative holes 69 with the circular cylinder portions of the locative pins 70 being fitted into the corresponding locative holes 69 with sufficient plays. The movable plate member 52 is thus floatingly supported by the floating mechanisms 58 typically shown in FIG. 7 and FIG. 10 in a direction of the plane of the movable plate member 52 within a range of each play provided between each of the locative pins 70 and locative holes 69. Such a play has a distance sufficient to cancel the positional error of the stopped position of the vehicle body B. In a step $SP_{13}'$, as shown in FIG. 15, the second robot Rb moves the nut fastening tool N further downward and the guide member 56 of the supporting apparatus S also moves downward accordingly. At this time, the guide tapered portion 79a of the guide rod 79 will be contacted with the flange 3a of the positioning hole 3 of the vehicle body B. When the guide member 56 is further moved downward in step $SP_{15}'$, the guide tapered portion 79a of the guide rod 79 is slided on the flange 3a of the positioning hole 3 due to the spring action of the spring 80 so that the guide tapered portion 79a is fitted into the positioning hole 3, as shown in FIG. 16, in such a way that the axis of the guide member 56 is moved toward the center of the positioning hole 3, receiving a reactive force of the flange 3a of the positioning hole 3. In this state, the second robot Rb stops. During this time, the movable plate member 52 by which the guide member 56 is supported via the bracket 77 intervened between the movable plate member 52 and guide member 56 receives a force in the same direction as the guide rod 79 which is moved in such a way that the axis of the guide member 56 is moved toward the center of the positioning hole 3. Since the movable plate member 52 is, at this time, floatingly supported on the base plate 51 via the floating mechanisms 58, the movable plate 52 is thus slided in accordance with the movement of the guide 79, compressing or expanding each coil spring 62a. On the other hand, the engagement member 55 of the supporting apparatus S is pressed against the strut P due to the spring force of the spring 84, moving according to the movement of the guide rod 79 toward the center of the positioning hole 3. The strut P is similarly moved in accordance with the movement of the engagement member 55 since the strut P is floatingly grasped in the radial direction with respect to the axle Ps of the strut P by means of the pair of clamping members 12 and vertical direction with respect to the strut tower 2 by means of the supporting rods 22 and the supporting shaft 15. At this time, since spring modulei of both springs 16 and 24 in the mechanical hand H for biasing the strut P upward as typically shown in FIG. 3 and FIG. 13 are set larger than those of the springs 80 and 84 in the supporting apparatus S for biasing the guide member 56 and engagement member 55 downward, the grasped strut P itself hardly moves upward and the engagement member 55 hardly moves vertically so that the spring 83 only is bent according to the distance by which the guide member 56 moves downward. Consequently, the relative positioning of the strut P and nut fastening tool N is determined and each socket 103 of the nut runners 90 and 91 reaches a position approximate to the upper surface of the strut tower 2 corresponding to each bolt inserting hole 5 of the strut tower 2.

Thereafter, the control unit (not shown), receiving a stop signal indicating the second robot Rb has stopped, sends an actuation signal to the second robot Rb to actuate the pair of lock members 53. In response to the actuation signal, in a step $SP_{17}$, the pair of lock members 53 are simultaneously actuated so as to stop the rotation of the rotating shafts 60 in the floating mechanisms 58. Accordingly, the casing 61, sliding shaft 62 and linkage shaft 64 are locked so that the movable plate member 52 is fixed to the base plate 51. In this way, the nut fastening tool N is completely positioned with respect to the vehicle body B and strut P is also positioned with respect to the vehicle body B through the engagement member 55.

Figure 17A:
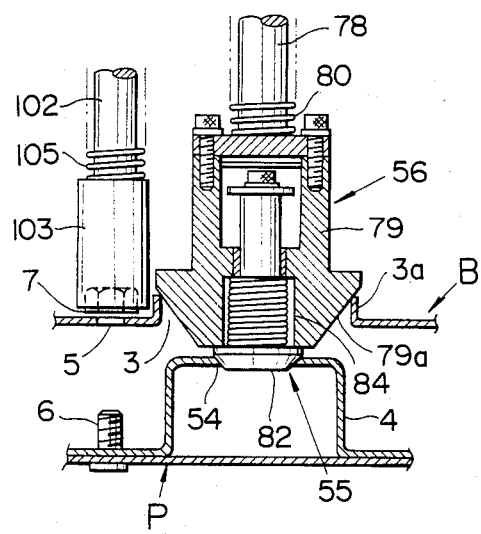
FIGS. 17(a) through 17(e) are essential part sectioned explanatory views showing that a plurality of bolts projected from the strut is fastened to corresponding nuts held by the fastening tool.
Figure 17B:
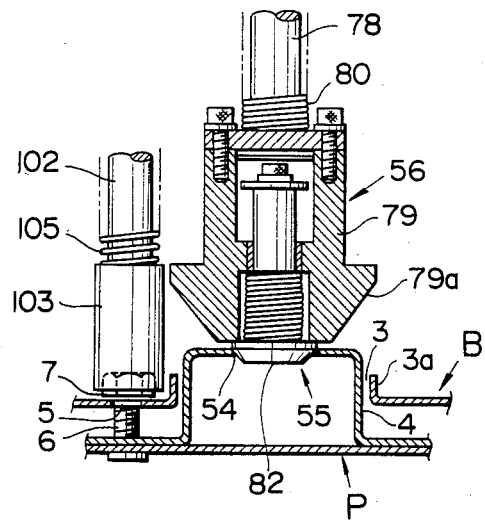
Figure 17:
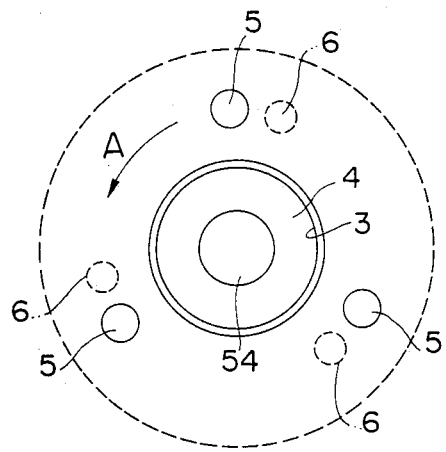
Figure 17:
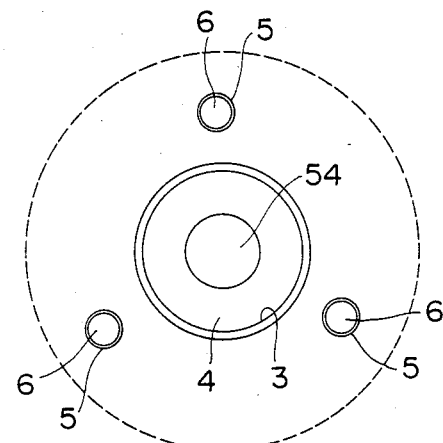
Figure 17:
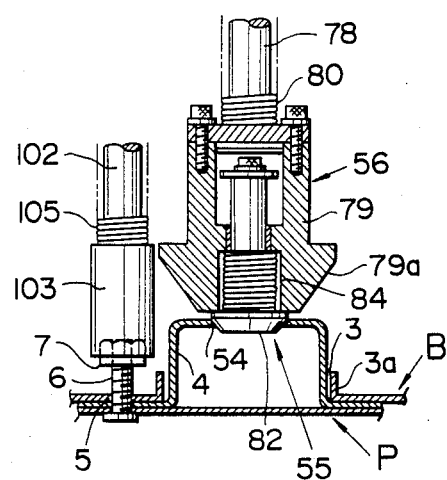

Upon the completion of the step $SP_{17}$, the first robot Ra moves the strut P upward in a step $SP_{18}$ until the strut P arrives at a position at which the strut P is attached to the strut tower 2 of the vehicle body B. At this time, assuming that each bolt 6 extended from the upper casing 4 of the strut P is preset out of phase with respect to each corresponding inserting hole 5 of the strut tower 2, for example, an angle of two degrees, each of the above-described bolts 6 is contacted with the wall of the lower surface of the strut tower 2 as shown by FIG. 17(a) and FIG. 17(b). During this time, the first robot Ra moves the strut P upward until the engagement member 55 of the nut fastening tool N is pushed upward against the spring force of the spring 84 to come into contact with the guide member 56 as shown in FIG. 17(a). Next, as shown in FIG. 17(b), the first robot Ra moves the strut P furthermore upward together with the mechanical hand H in a step $SP_{19}$ to push upward both engagement member 55 and guide member 56 of the supporting apparatus S, so that the bolts 6 of the strut P are brought in contact with the wall of the lower surface of the strut tower 2 as described hereinabove. In this state, the first robot Ra moves upwardly approximately by an axial length of each bolt 6 of the strut P. However, since the upward movement of the strut P is interrupted by the vehicle body B, the strut P itself does not move upward as shown in FIGS. 2 and 3 and instead of the strut P the supporting shaft 15 and supporting rod 22 are moved downward respectively along the axial direction of the strut P against the biasing forces of the springs 16 and 24. Consequently, the bolts 6 projected from the upper casing 4 are pressed against the wall of the lower surface of the strut tower 2 by means of the biasing forces of the respective springs 16 and 24. In a step $SP_{20}$, when a tip axis of the first robot Ra supporting the mechanical hand H is rotated through a predetermined angle, e.g., 4° toward a direction denoted by A of FIG. 17(c), the strut P is accordingly rotates toward the direction A.

At this time, the bolts 6 of the strut P turns in the direction A sliding along the wall of the lower surface of the strut tower 2. As shown in FIG. 17(d) which indicates the engagement of the bolts 6 with the inserting holes 5, when the bolts 6 coincide with the positions of the respective bolt inserting holes 5, the bolts 6 are penetrated through the bolt inserting holes 5 by means of the biasing forces of the springs 16 and 24 of the mechanical hand H. In this case, although the strut P will be rotated through the predetermined angle (four degrees) which is longer than the difference in phase between the bolts 6 and bolt inserting holes 5, the rotation of the upper casing 4 of the strut P is interrupted after the bolts 6 are penetrated through the respective bolt inserting holes 5 and the axle Ps of the strut P only rotates, the upper casing 4 of the strut P being not rotated.

In this state, the bolts 6 penetrated through the respective bolt inserting holes 5 are brought in contact with lower surfaces of the respectively corresponding nuts 7 held by the respective sockets 103 of the nut runners 90 and 91 as shown in FIG. 17(e) and, furthermore, the respectively corresponding nuts 7 are pushed upward against the biasing forces of the springs 105 wound on the linkage shafts 102. Upon the completion of the upward movement of each socket 103 by a predetermined distance, a limit switch (not shown) is actuated so that a nut fastening preparation signal indicating that the bolts 6 are penetrated through the bolt inserting holes 5 is sent to the control unit.

Figure 18:
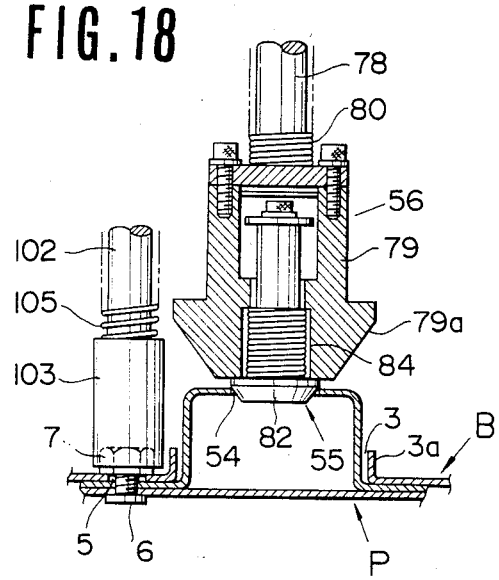
FIG. 18 is an essential part sectioned explanatory view showing that one of the bolts projected from the strut is completely fastened to the corresponding nut held by a nut runner constituting the fastening tool.

Thereafter, upon receipt of an actuation command signal from the control unit in response to the nut fastening preparation signal, the rotating axle of each nut runner 90 and 91 rotates in a step $SP_{22}$ so that each of the nuts 7 held within the corresponding socket 103 is fastened to the corresponding bolt 6, as shown in FIG. 18. When the fastening torque of each nut 7 with respect to the corresponding nut 7 exceeds a predetermined value, the rotation of the rotating axle of each nut runner 90 and 91 is ended by means of a nut fastening torque detector (not shown). Since at this time the bolts 6 of the strut P are pulled upward together with the fastening operation of the respective nuts 7, the strut P is securedly attached to the strut tower 2 of the vehicle body B when the nut fastening torque of the respective nuts 7 arrives at the predetermined value in steps $SP_{23}$ and $SP_{24}$.

Thereafter, when the control unit sends the nut fastening completion signal to the first robot Ra, the pair of clamping members 12 of the mechanical hand H are opened angularly so that the grasping of the axle Ps of the strut P is released in a step $SP_{25}$ and thereafter the mechanical hand H is moved downward in a step $SP_{26}$ to separate from the strut tower 2 of the vehicle body B to which the strut P has been fixedly attached. The first robot Ra, in a step $SP_{27}$, returns the mechanical hand H to its originally start position to prepare for the subsequent attaching operation. Simultaneously, the pair of lock members 53 of the supporting apparatus S, i.e., electromagnetic brakes typically shown in FIG. 7 are deenergized in a step $SP_{25}'$ so that the movable plate member 52 returns to the floating state as described above.

Figure 19:
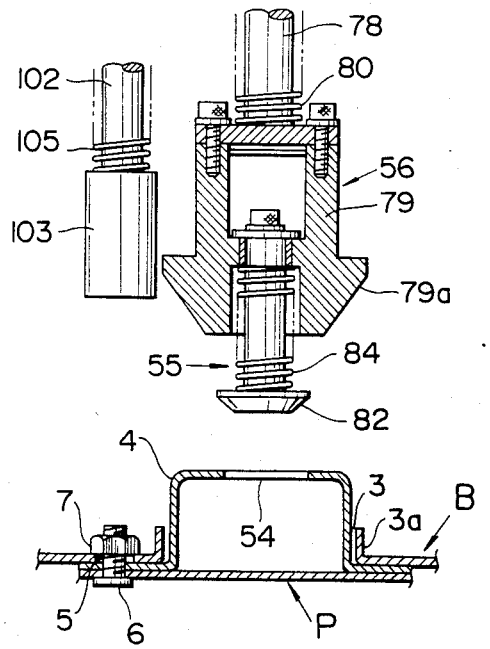
FIG. 19 is an essential part sectioned explanatory view showing that the supporting apparatus and nut runner are moved upward after the steps shown in FIGS. 14 through 18 are completed.

The second robot Rb, in a step $SP_{26}'$, moves the nut fastening tool N upward until a position shown in FIG. 19 is reached.

At this time, since the movable plate memver 52 is in the floating state, each member of the supporting apparatus S receives no load via the movable plate member 52 during the upward movement of the second robot Rb. In a step $SP_{27}'$, the supporting apparatus S and nut fastening tool N are returned to the original start position through the second robot Rb.

It should be noted that after the supporting apparatus S is returned to the original start position in the step $SP_{27}'$, the pair of lock mechanisms 53' are actuated to lock the movable plate member 52 in the fixed state to prepare for the subsequent attaching operation.

The sub-assembly attaching operation by means of the above-described system is thus completed.

In the above-described embodiment, the main frame 11 constituting the mechanical hand H is so constructed that the lower end of the strut P is supported by the supporting shaft 15. However, it is not specially needed to provide such a supporting shaft 15 in the main frame 11 and the strut P may be grasped by using only the pair of clamping members 12 freeing the lower end of the strut P. In addition, although each of the pair of clamping members 12 is so constructed that the pair of floating mechanisms 27 are intervened between each movable arm 26 and contacting plate 28, the pair of movable arms may directly be attached to the main frame 11 via such floating mechanisms.

Furthermore, although each floating mechanism 27 floatingly and main frame 11 support the strut P in the radial and axial directions of the strut P in the above-described embodiment, such a floating mechanism as supporting the strut P in at least the axial direction only may alternatively be used. Another type of lock means may alternatively be used for the pair of lock members 13.

Figure 20:
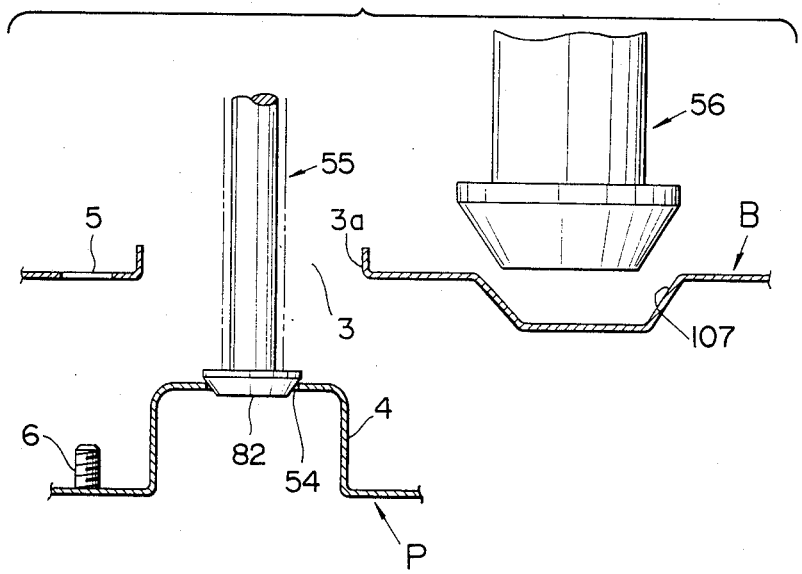
FIG. 20 is an essential part sectioned explanatory view showing a variation of positionings between the fastening tool and strut and between the fastening tool and strut with respect to the vehicle body.
Figure 21:
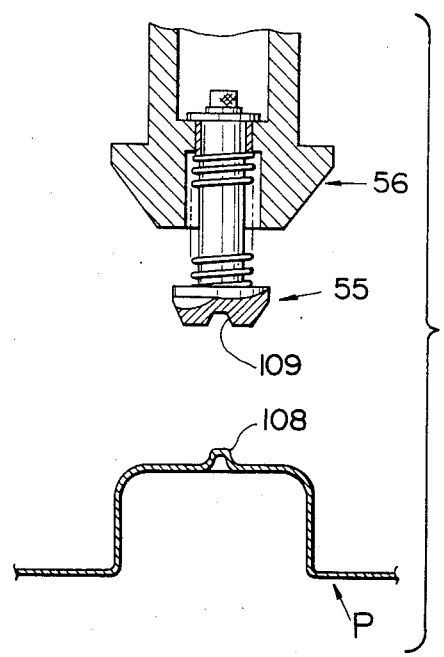
FIG. 21 is an essential part sectioned explanatory view showing a variation of an engagement member of the supporting apparatus and engagement portion of the strut other than those shown FIGS. 7 through 20.
Figure 22A:
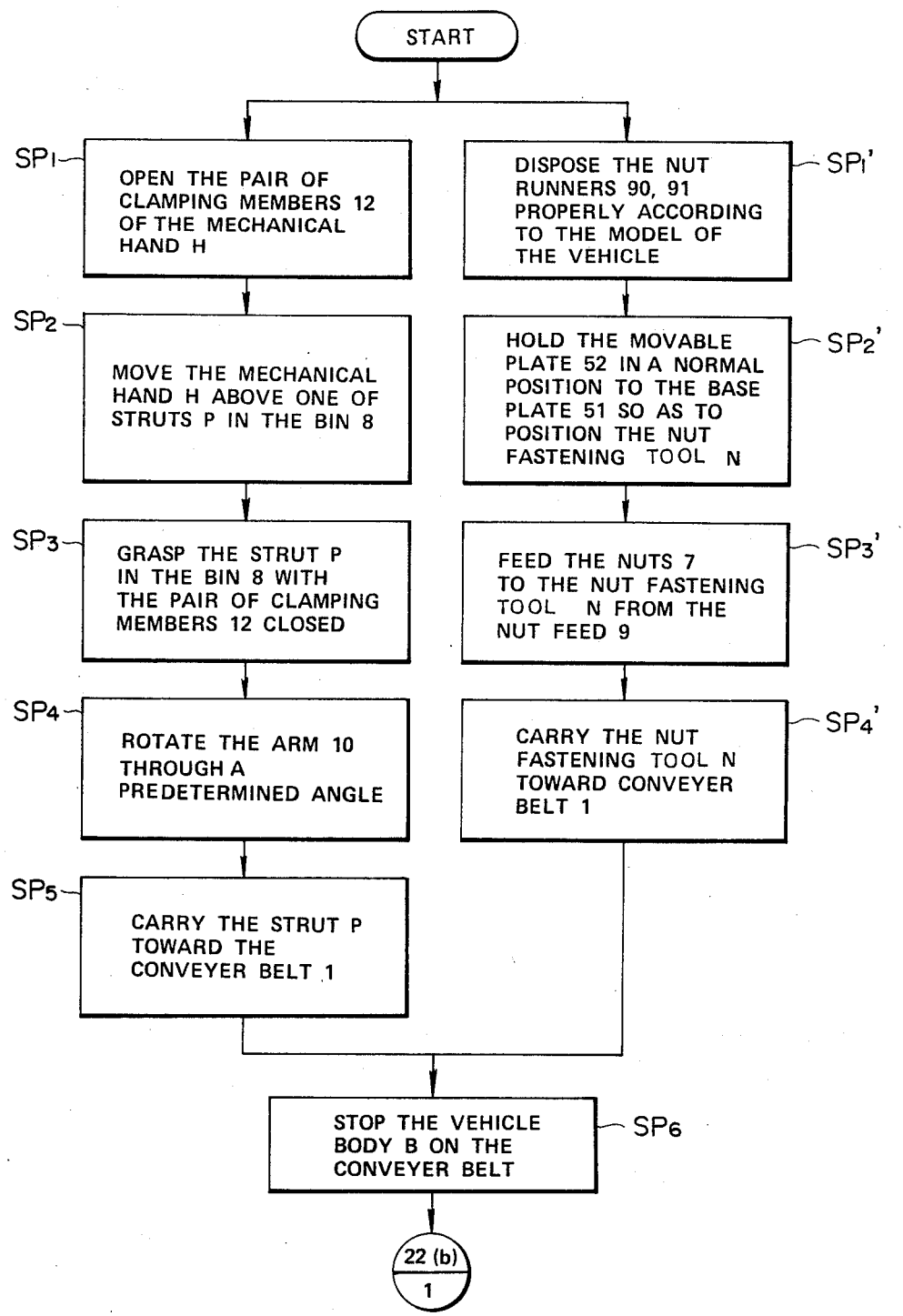
FIGS. 22(a) through 22(e) integrally show a flowchart of the operation of the system for automatically attaching the strut to the vehicle body typically shown in FIG. 1.
Figure 22:
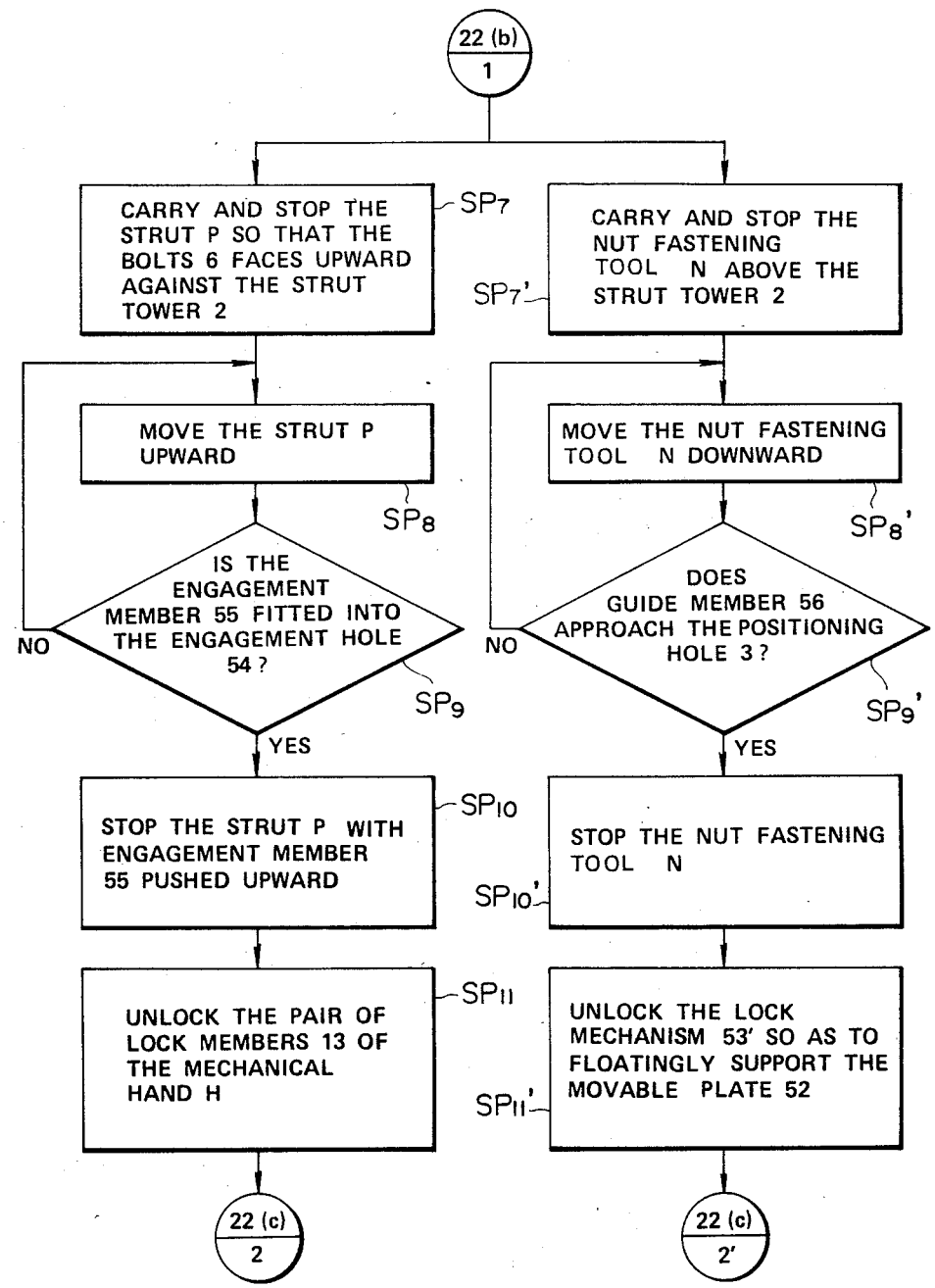
Figure 22C:
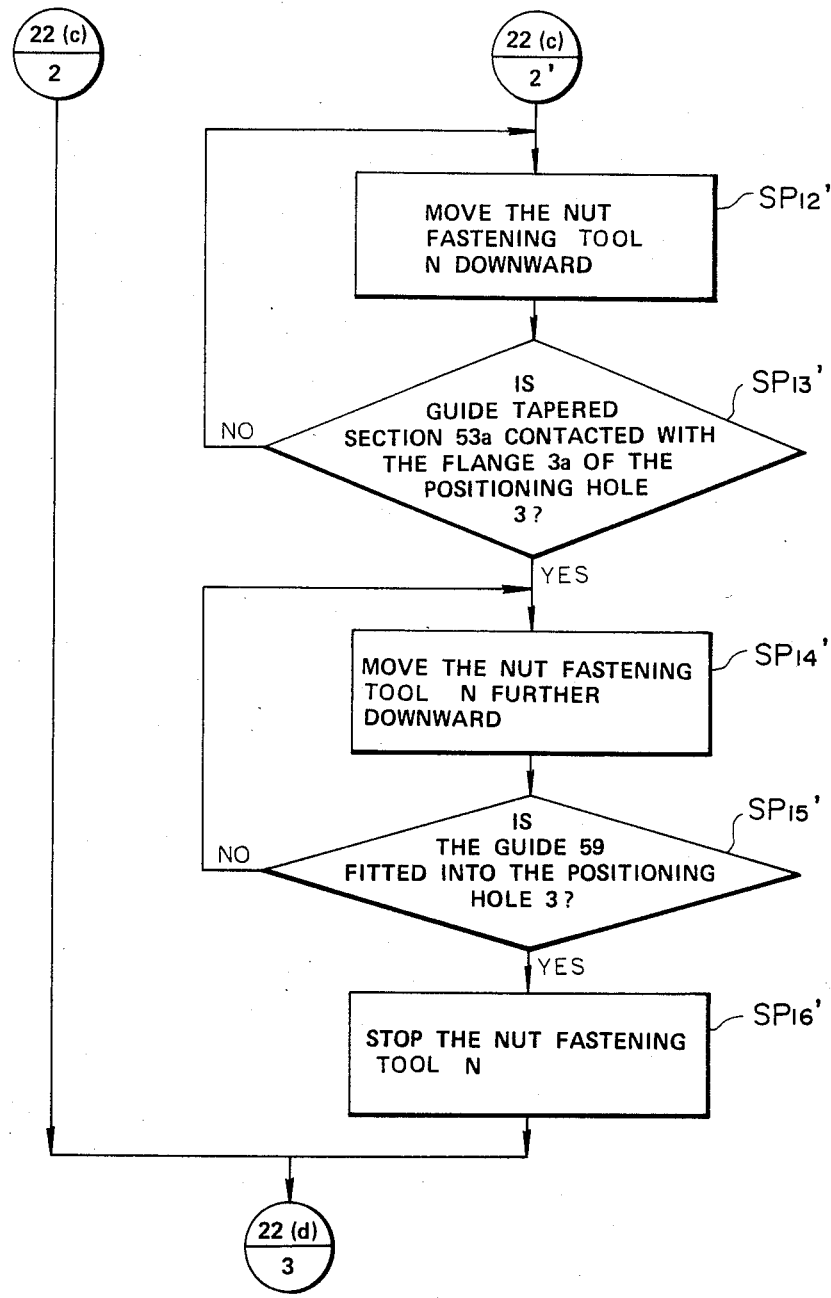
Figure 22D:
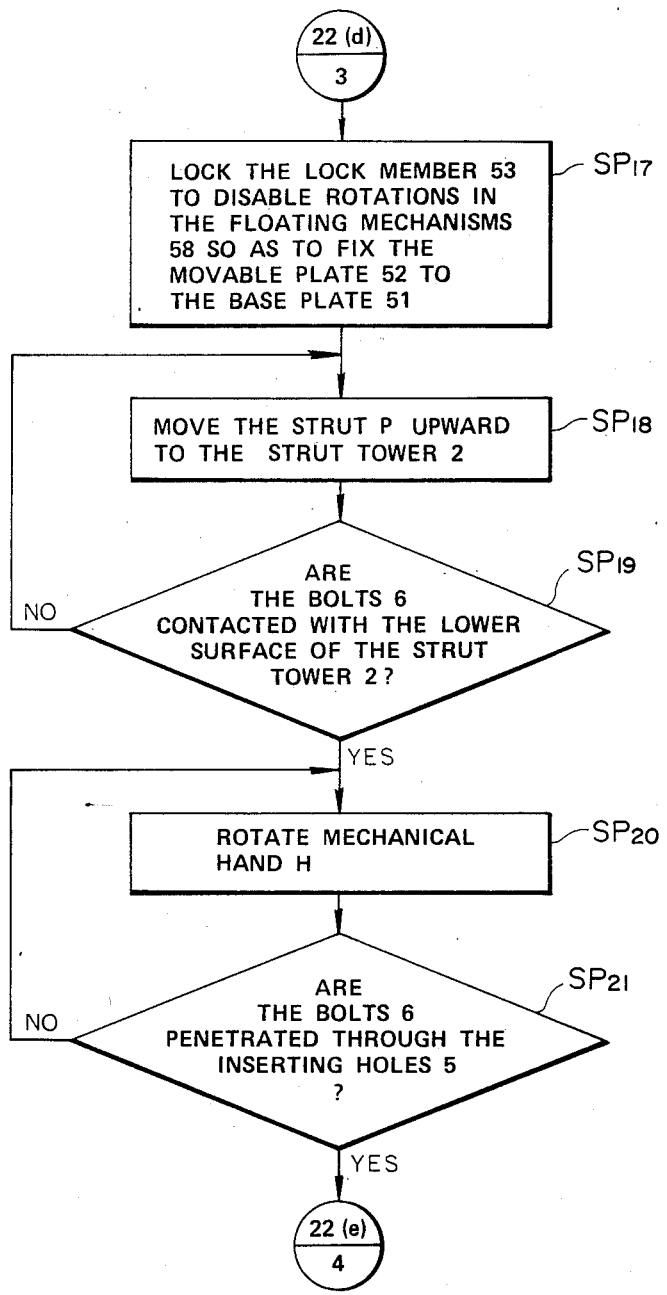
Figure 22E:
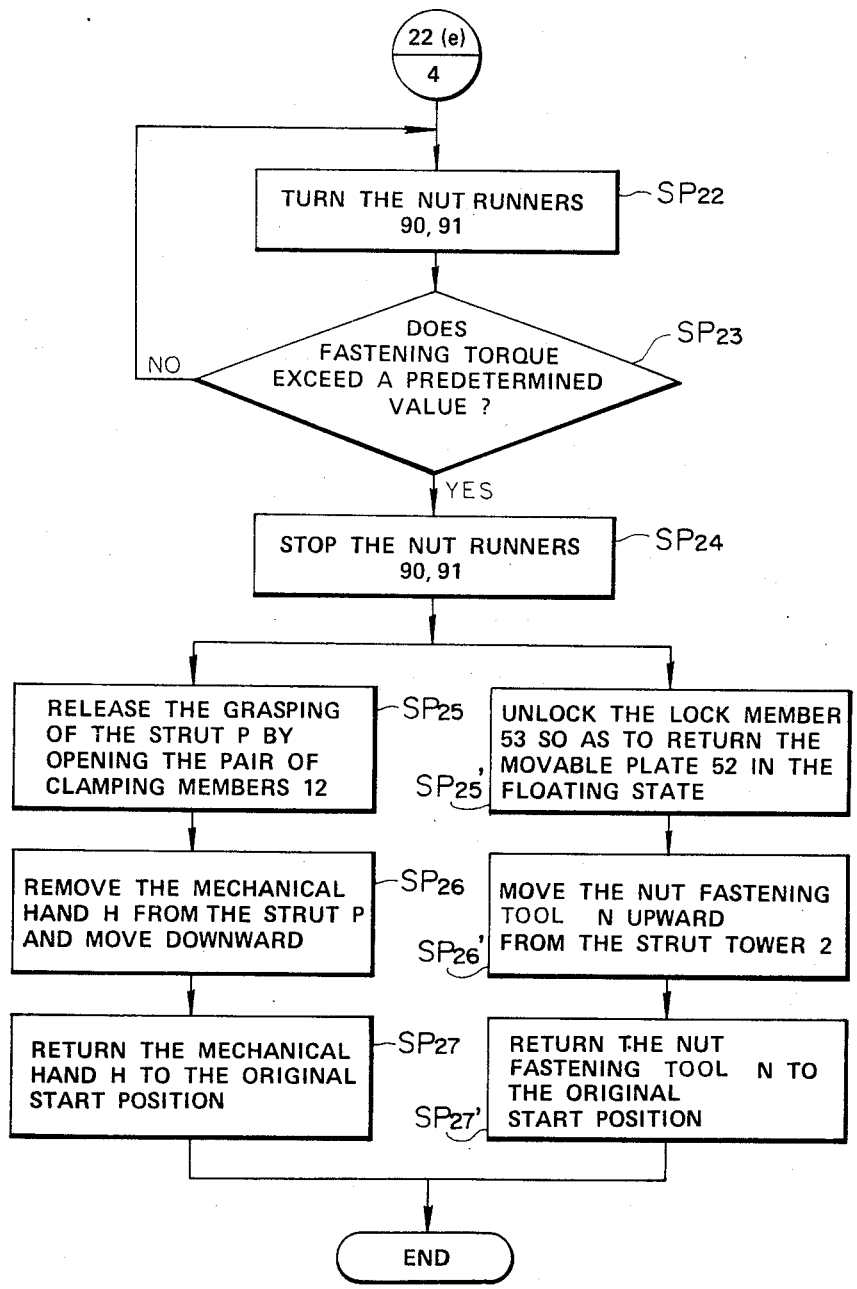

On the other hand, other types of floating mechanisms 58 and locking means of the supporting apparatus S may alternatively be used. In addition, although the guide member 56 and engagement member 55 are provided on the same axis with respect to the movable plate member 52 in the supporting apparatus S of the above-described embodiment and the guide member 56 is engaged with the positioning hole 3 of the strut tower 2, the guide member 56 and engagement member 55 may be provided in different axes from each other and such a positioning section as another positioning hole or positioning recess 107 shown in FIG. 20 may be provided with which the guide member 56 is engaged so that the axis of the guide member 56 is moved toward the center of such other positioning section. On the other hand, although the engagement member 55 is, in the above-described preferred embodiment, engaged with the engagement hole 54 provided at the upper casing 4 of the strut P, a tip of the engagement member 55 may alternatively be provided with an engagement recess 109 as shown in FIG. 21 while an engagement convex 108 may alternatively be provided at a corresponding tip of the upper casing 4 of the strut P.

Furthermore, although the above-described embodiment describes the strut P as the sub-assembly in the manufacturing of the automotive vehicle, the present invention can be applied equally well to the attaching operation of another workpiece. In this case, if welded nuts having threaded portions are provided at such a workpiece, an automatic bolt fastening tool may be attached to the second robot Rb in place of the nut fastening tool N.

FIG. 23 through FIG. 26 typically show another example of the supporting apparatus denoted by S' supporting the nut fastening tool N applicable to the system for automatically attaching the strut P to the vehicle body B.

In this type of supporting apparatus S', like numerals designate corresponding elements described in the supporting apparatus S shown in FIG. 1 through FIG. 22(e).

Figure 24:
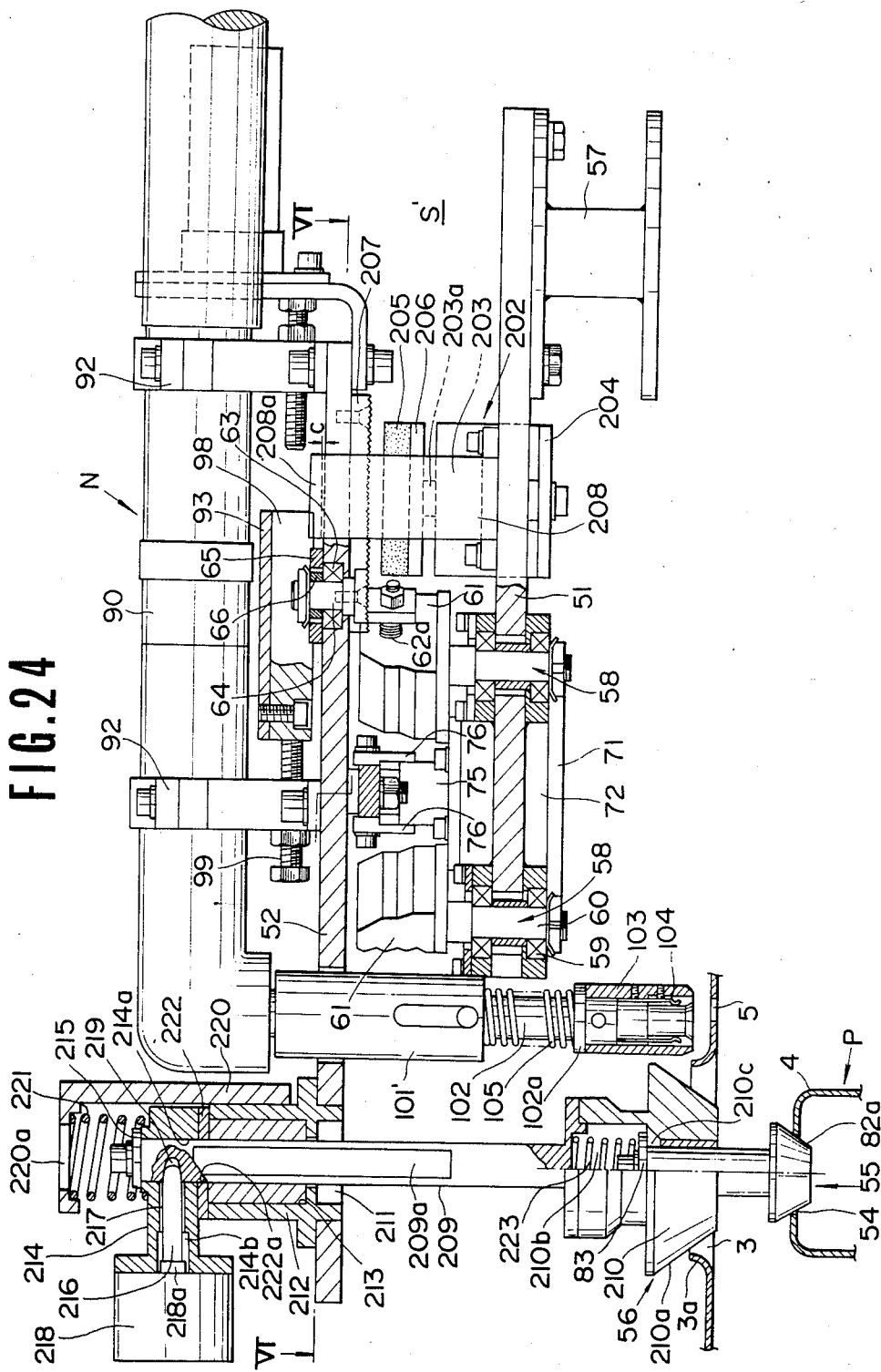
FIG. 24 is a partially sectioned front view of the supporting apparatus shown in FIG. 23.

In this type of supporting apparatus S', there is provided a floating set mechanism 201 for setting an distance of floating of the movable plate member 52 with respect to the base plate 51. The floating set mechanism 201 is the same in construction as the locking mechanism 53' of the above-described supporting apparatus S although the differnt terms are used. In addition, instead of the lock members 53 in the above-described supporting apparatus S there is provided a pair of locking members 202 disposed between the base plate 51 and movable plate member 52. The pair of locking members 202 comprises: (a) a pneumatic cylinder 203, having a piston rod 203a as shown in FIG. 24, fixed to the base plate 51 via a bracket 204, the piston rod 203a being operatively extruded toward the movable plate member 52; (b) a braking shoe 205 made of an elastic material such as a synthetic rubber or polyurethane rubber which is removably attached to a tip of the piston rod 203a of the pneumatic cylinder 203 via a holding bracket 206; and (c) a friction plate 207, attached to a base plate side surface of the movable plate member 52 and faced toward the braking shoe 205, having a lower surface in a form of fine sawteeth processed by a knurling. When the piston rod 203a of the pneumatic cylinder 203 is intruded into the pneumatic cylinder 203, the above-described braking shoe 205 is spaced apart from the friction plate 207 so that the movable plate member 52 is floatingly supported the base plate 51. On the contrary, when the piston rod 203a of the pneumatic cylinder 203 is extruded from the pneumatic cylinder 203, the above-described braking shoe 205 is brought in close contact with the friction plate 207 so as to press the friction plate 207 upward. Due to the frictional force between both braking shoe 205 and friction plate 207, the movable plate member 52 is, in turn, tightly fixed to the base plate 51 via the locking members 202.

Figure 25:
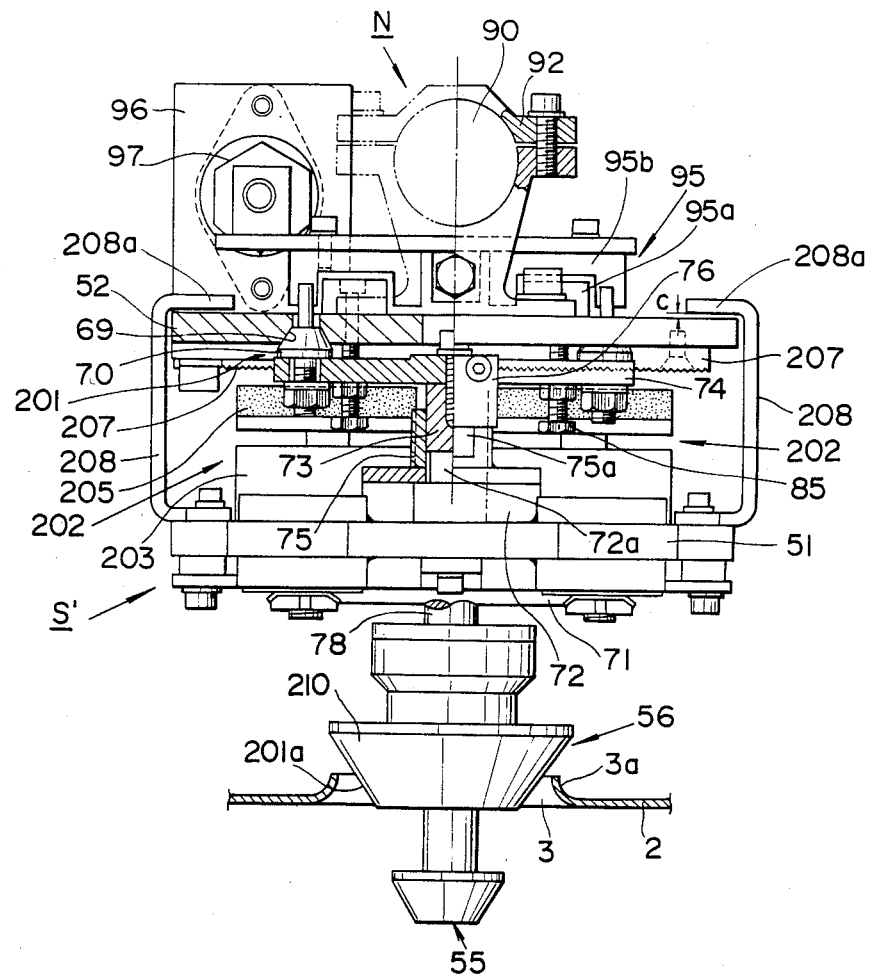
FIG. 25 is a partially sectioned left side view of the supporting apparatus as viewed from FIG. 23.
Figure 26:
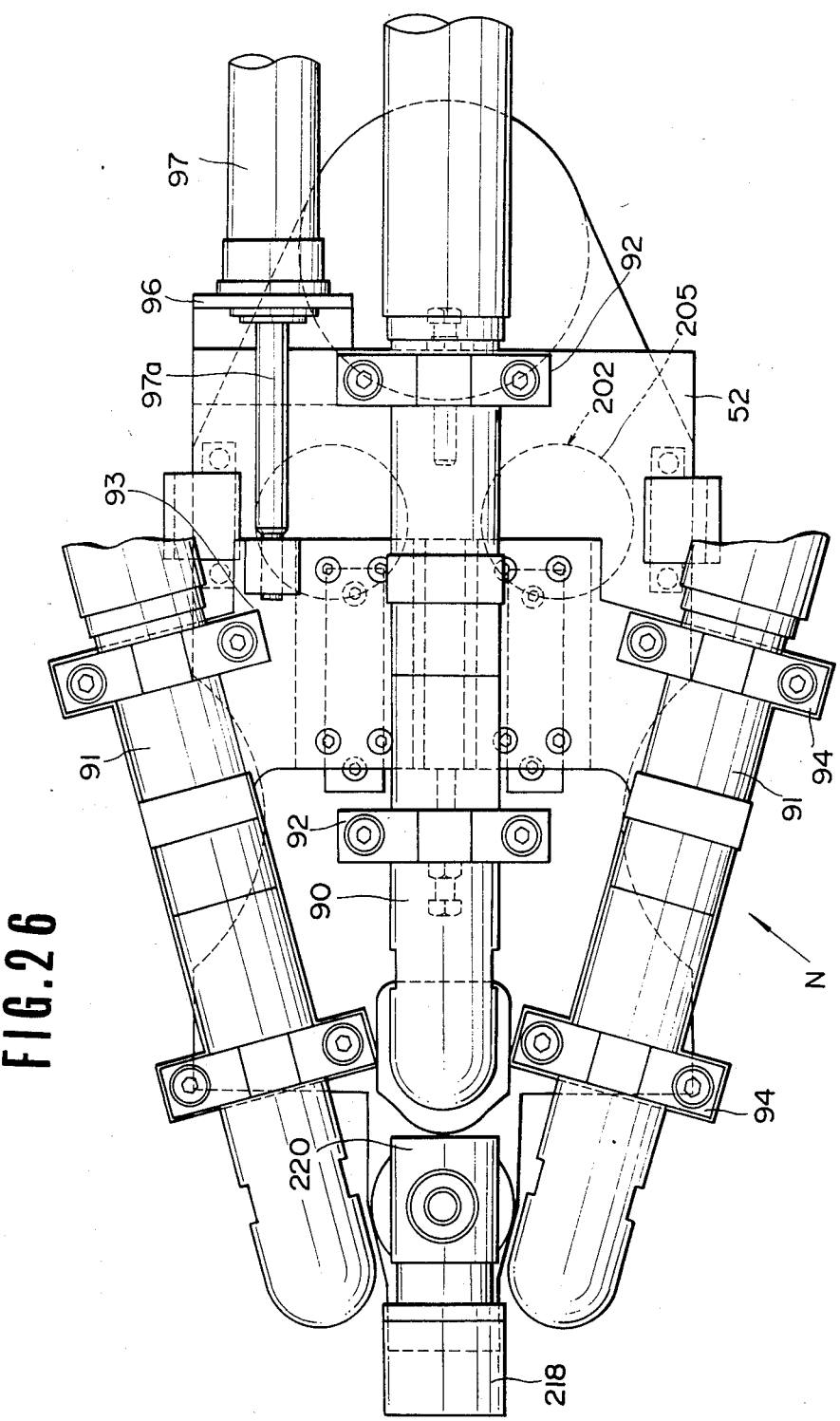
FIG. 26 is a top view of the supporting apparatus shown in FIGS. 23 through 25.

In addition, there is provided a pair of stopping brackets 208, as typically shown in FIG. 25, attached to both upper sides of the base plate 51 in the vicinity of the pneumatic cylinder 203 of the locking members 202. The pair of stopping brackets 208, each formed in a substantially letter C shape, are disposed so as to embrace both upper side edges of the movable plate member 52. It should be noted that a gap c of substantially 0.5 millimeters is formed between each projecting arm 208a of the pair of stopping brackets 208 and upper surface of the movable plate memver 52 as shown in FIG. 25. The gap c described above is provided for maintaining both the pair of the stopping brackets 208 and movable plate member 52 in a non-contacting state with each other even if the movable plate member 52 is disposed at a position slightly deviated from its normal position due to any clearance in the sliding portion among the members constituting the floating mechanisms 58. Therefore, the movable plate member 52 can be maintained float in a plane parallel to the base plate 51.

When the movable plate member 52 is fixed to the base plate 51 by means of the locking members 202, the movable plate member 52 is pressed upward by means of the braking shoe 205. However, since the upward movement of the movable plate member 52 is limited by means of the above-described pair of stopping brackets 208, the movable plate member 52 will not partially be cambered. Thus, a stress due to such a camber which will be concentrated on each floating mechanism 58 can be avoided.

Next, the construction of the guide member 56 in the supporting apparatus S' will be described hereinbelow since the construction thereof is different from that of the above-described guide member 56 in the supporting apparatus S.

In details, the guide member 56, as shown in FIG. 24, comprises: (a) an elongated shaft 209 extending along upward and downward directions with respect to the movable plate member 52; and (b) a guide rod 210 having a guide tapered portion 210a, attached to the lower end of the shaft 209. The guide tapered portion 210a of the guide rod 210 is in a form of an inversed circular cylindrical truncated cone for fitting into the positioning hole 3 provided at the strut tower 2 of the vehicle body B. In this supporting apparatus S', the above-described shaft 209 is penetrated into a hole 211 provided in the vicinity of an extended end of the movable plate member 52 and is slidably supported by a cylindrical bracket 212 via a bushing 213. A bottom end of the cylindrical bracket 212 is attached to the edge of the hole 211 of the movable plate member 52. As appreciated from FIG. 23, a floating member 214 having a shaft inserting hole 214a through which the shaft 209 is slidably inserted is arranged at the upper end of the cylindrical bracket 214. A lock washer 215 is attached to the edge of the inserting hole 214a of the floating member 214. The shaft 209 is penetrated through the inserting hole 214a and attached to the lock washer 215 at the upper end thereof. A surrounding portion around the floating member 214 includes: (a) another hole 214b, provided in the floating member 214, communicated with the inserting hole 214a, and which is orthogonal to the inserting hole 214a; (b) a lock pin 216 movably inserted within the hole 214b via a bushing 217; and (c) a pneumatic cylinder 218 attached to the floating member 214 having a piston rod 218a, an extended end thereof being fixed to the lock pin 216. In a case when the piston rod 218a of the pneumatic cylinder 218 is extruded from the pneumatic cylinder 218, the lock pin 216 is fitted into a lock hole 219 provided within the shaft 209 so that the floating member 214 is fixed to the shaft 209. On the contrary, when the piston rod 218a of the pneumatic cylinder 218 is intruded into the corresponding cylinder 218, the lock pin 216 is separated from the lock hole 219 so that the shaft 209 can be moved vertically relative to the floating member 214. In addition, a spring pressing bracket 220 having an inversed L-shaped section is attached to a surrounding outside wall of the above-described cylindrical bracket 212. The spring pressing bracket 220 covers an upper surface of the floating member 214, ensuring the upward and downward movement of the floating member 214. A spring 221 is intervened between the spring pressing bracket 220 and floating member 214. An inserting hole 220a for the shaft 209 is penetrated at a upper side wall of the spring pressing bracket 220 which is located on an axial line of the shaft 209. It should be noted that the rotation of the shaft 209 is interrupted since a chamferred portion 209a formed at the shaft 209 is fitted into a hole 222a of a rotation stopping plate 222 attached to a lower surface of the floating member 214. It should also be noted that the rotation of the above-described floating member 214 is interrupted in such a way that one side surface of the floating member 214 is brought in contact with a longitudinal wall surface of the spring pressing bracket 214 as appreciated from the right side surface of the floating member 214 in FIG. 24.

The above-described guide rod 210 is provided with a hollow portion 210b having an opening at a lower end thereof. Within the hollow portion 210b of the guide rod 210, the engagement tapered portion 82a in the inverted circular truncated cone shape, i.e., the engagement member 55 having an engagement portion engageable with the corresponding engagement hole 54 of the upper casing 4 of the strut P being incorporated in the same axis of the guide member 56. The engagement member 55 is provided so as to enable the upward and downward movement with the lock washer 83 being in engagement with a stop portion 210c located at the opening of the hollow portion 210b of the guide member 56. The engagement member 55 is biased downward by means of a spring 223 intervened between the upper end of the engagement member 55 and upper inner wall of the hollow portion 210b of the guide member 56. As appreciated from FIG. 24, the engagement tapered portion 82a of the engagement member 55 is arranged so as to always project downward at a position lower than the guide rod 210. Joints 101' are fixed respectively to the rotational axles of the stationary and movable-type nut runners 90 and 91 of the nut fastening tool N supported by this supporting apparatus S'.

The operation of the supporting apparatus S' used in the above-described system which automatically attaches the strut P to the vehicle body B will be described hereinbelow.

In a first step, the first robot Ra shown in FIG. 1 actuates the mechanical hand H to grasp one of the struts P mounted previously within the pin 8 and stops at a position lower than the strut tower 2 of the vehicle body B to be transported on the conveyor belt 1 in accordance with preprogrammed instructions issued by the control unit (not shown). On the other hand, the second robot Rb moves the nut fastening tool N toward the conveyer belt 1 and stops at a position above the strut tower 2 of the vehicle body B to be transported in accordance with preprogrammed instructions issued by the control unit (not shown). During this step, the control unit sends to the send robot Rb the selective signal indicating a model of the vehicle relating to the vehicle body B to which the strut P is to be attached. The pair of the movable-type nut runners 91 are placed properly to meet the model of the vehicle. At this time, the piston rod 72a of the pneumatic cylinder 72, typically shown in FIG. 25, is extruded from the pneumatic cylinder 72 with the pair of locative pins 70 tightly fitted into the corresponding locative holes 69. The nut fastening tool N is positioned at the normal position with respect to the second robot Rb. Furthermore, the abovedescribed piston rod 218a of the pneumatic cylinder 218, typically shown in FIG. 24, is extruded from the pneumatic cylinder 218, the lock pin 216 inserted into the lock hole 219 so as to fix the floating member 214 to the guide member 56. Simultaneously, each socket 103 of the nut fastening tool N holds the nut 7 via the flat spring 104. In this state shown in FIG. 28, the strut P and nut fastening tool N are aligned respectively at their mutually corresponding positions sandwiching the strut tower 2 of the vehicle body B on a basis of the operating accuracies of both first and second robots Ra and Rb. In more details, each socket 103 of the nut fastening tool N has the same vertical axis as the bolts 6 extended from the upper casing 4 of the strut P. However, since the accuracy with which the vehicle body B transported by the conveyor belt 1 is stopped is relatively low as against the operating accuracies of both first and second robots Ra and Rb, the positioning hole 3 of the strut tower 2 is usually deviated slightly from the stopped positions of both of the strut P and nut fastening tool N toward either front or rear direction along the conveyor belt 1 with respect to the predetermined position at which the vehicle body B is stopped. In this state, the second robot Rb moves the nut fastening tool N downward until the guide tapered portion 201a of the guide member 56 approaches to a position in the proximity of the flange 3a provided at the edge of the positioning hole 3 as shown in FIG. 29, while the first robot Ra moves the strut P upward. At this time, the engagement member 55 of the supporting apparatus S' is passed through the positioning hole 3 and located at a position lower than the positioning hole 3. At this time, the engagement tapered portion 82a of the engagement member 55 is fitted into the engagement hole 54 of the upper casing 4 of the strut P so that the engagement member 55 of the supporting apparatus S' is pressed slightly upward against the biasing force of the spring 223. In this way, the relative positioning of both strut P and nut fastening tool N is completed.

In the subsequent step, the positioning of the strut P and nut fastening tool N relative to the vehicle body B is carried out.

Figure 27:
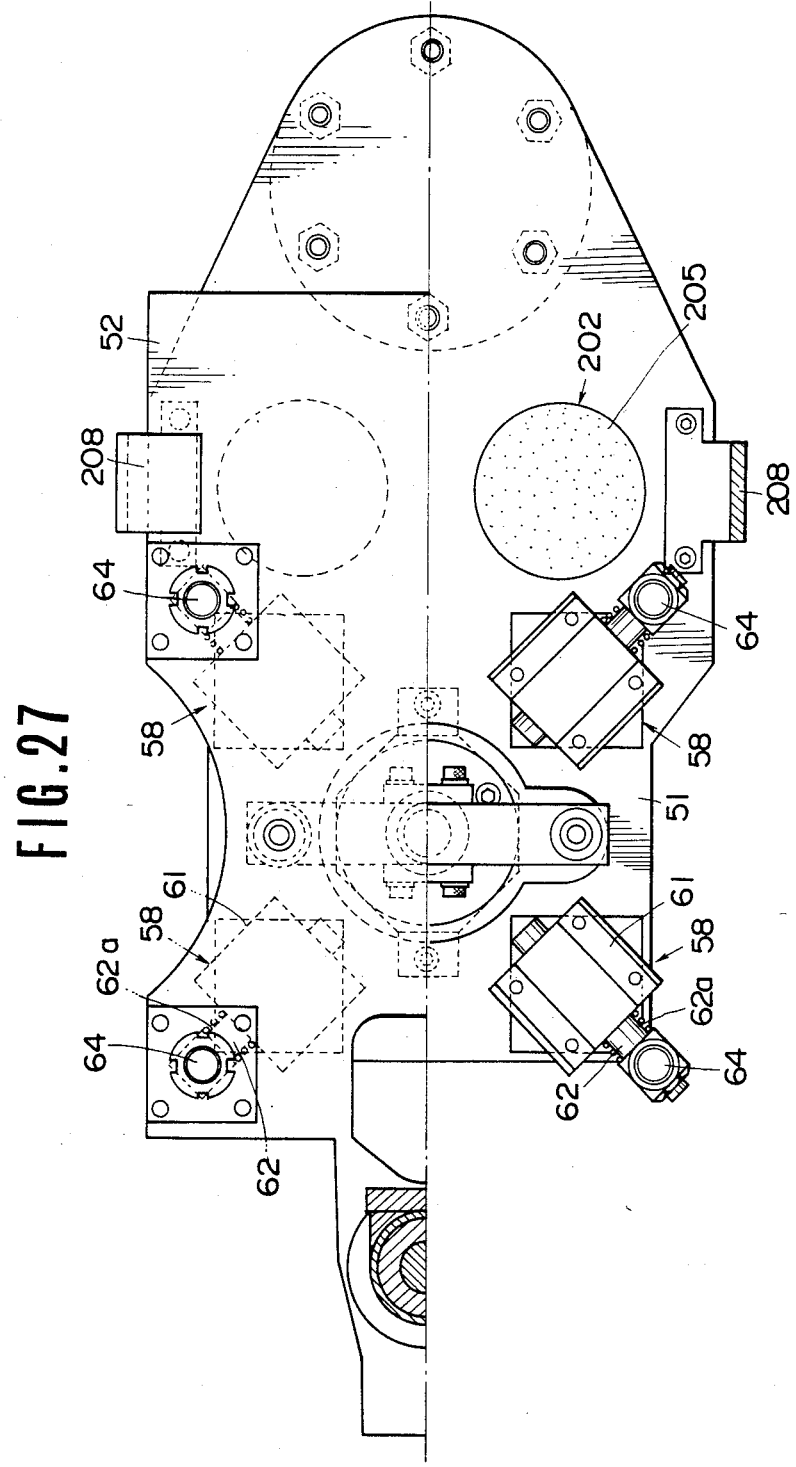
FIG. 27 is a partially sectioned view of the supporting apparatus taken along the line XI—XI shown in FIG. 24.

In this step, the control unit (not shown) sends the engagement end signal indicating that the strut P, i.e., the engagement hole 54 provided at the upper casing 4 of the strut P has engaged with the engagement member 55 to the second robot Rb. Upon receipt of this engagement end signal, the second robot Rb unlocks the floating set mechanism 201 in the supporting apparatus S' so as to render the movable plate member 52 float. In other words, the piston rod 72a projected from the pneumatic cylinder 72 is intruded into the pneumatic cylinder 72 by the actuation of the second robot Rb in response to the above-described engagement end signal so that the locative pins 70 are accordingly moved downward and the circular cylindrical sections of the locative pins 70 are, in turn, loosely fitted to the corresponding locative holes 69 of the movable plate member 52. The movable plate member 52 is floatingly supported by the floating mechanisms 58 shown in FIGS. 24 and 27 in a direction of a horizontal plane of the movable plate member 52 within a range of a gap distance between the loosely fitted locative pins 70 and corresponding locative holes 69. In this case, the strut P is also floatingly supported by means of the mechanical hand H as described above.

In this state, as shown in FIG. 29 and FIG. 30, the second robot Rb moves the nut fastening tool N and supporting apparatus S' downward and accordingly the guide member 56 is also moved downward, so that the guide tapered portion 210a of the guide rod 210 is brought in contact with the flange 3a provided at the edge of the positioning hole 3 of the strut tower 2. When the second robot Rb further moves the nut fastening tool N downward and accordingly the guide member 56 of the supporting apparatus S' is also further moved downward, the guide member 56 receives a reactive force from the flange 3a. However, since the floating member 214 is fixed to the guide member 56 via the lock hole 219, the spring action of the above-described spring 221 is transmitted to the guide member 56 via the floating member 56 so that the guide member 56 is biased downward. Therefore, the guide tapered portion 210a of the guide rod 210 slides downward on the flange 3a. The guide rod 210 is correspondingly fitted into the positioning hole 3 as seen from a position denoted by the phantom line to a position denoted by the solid line in FIG. 30 in such a way that the axis of the guide member 56 moves toward the center of the positioning hole 3. The robot Rb is then stopped with the guide 210 fitted completely into the positioning hole 3. During this time, i.e., while the guide 210 is fitted into the positioning hole 3, the movable plate member 52 receives a force via the shaft 209 in the same direction as the force of the guide rod 210 which advances its axis to the center of the positioning hole 3. However, since the movable plate member 52 is floatingly supported on the base plate 51 by means of the floating mechanisms 58, the movable plate 52 follows the movement of the guide rod 210, compressing or expanding each coil spring 62a as described above. On the other hand, it will be appreciated that the engagement member 55 will follow the fitting movement of the guide rod 210 into the positioning hole 3. However, since the engagement member 55 is pressed toward the strut P due to the spring force of the spring 223 and the strut P is floatingly supported by the pair of clamping members 12 of the mechanical hand H as described above, the strut P will also follow the fitting movement of the engagement member 55. Consequently, the relative positional relationships are determined among the vehicle body B, strut P, and nut fastening tool N. Each socket 103 of the stationary and movable-type nut runners 90 and 91 constituting the fastening tool N is therefore placed at a position in proximity of the upper surface of the strut tower 2 and facing each corresponding bolt inserting hole 5. Thereafter, upon the receipt of a stop signal indicating that the second robot Rb has stopped, the control unit (not shown) issues an actuation command signal to the second robot Rb. The second robot Rb, responsive to the actuation command signal, actuates again the lock member 202 to lock the movable plate member 52 so as to fix the movable plate member 52 with respect to the base plate 51.

In more detail, the second robot Rb causes the pneumatic cylinder 203 shown in FIG. 24 to extrude the piston rod 203a therefrom. At this time, the braking shoe 205 presses the friction plate 207 so that the movable plate member 52 is fixed to the base plate 51. In this way, the nut fastening tool N is positioned with respect to the vehicle body B, while the strut P is positioned with respect to the vehicle body B via the engagement member 55.

At the same time, the control unit (not shown) issues a release command signal to release the biasing force of the spring 221 toward the guide member 56. Upon receipt of this release command signal, the second robot Rb causes the pneumatic cylinder 218 to intrude the piston rod 218a thereinto, thus the lock pin 216 being removed from the lock hole 219 as shown by the phantom line in FIG. 30. Accordingly, the floating member 214 which has been slightly raised by the engaged shaft 209 is moved downward to come in contact with the upper surface of the guide bracket 212. At this time, since the floating member 214 is not moved in accordance with the movement of the guide member 56, the biasing force of the spring 221 is not transmitted to the guide member 56.

Thereafter, the first robot Ra, in response to the actuation command signal to the control unit (not shown), moves the strut P upward until a predetermined position is reached as appreciated from FIG. 31. At this time, the engagement member 55 is pushed upward by the strut P against the biasing force of the spring 223 and then both engagement member 55 and guide member 54 are pushed upward simultaneously. Consequently, the shaft 209 is moved upward. At this time, since the shaft 209 receives no biasing force from the spring 221, the spring 221 will not deform as the shaft 209 is moved upward. In addition, the movable plate member 52 receives no deformable force due to the deformation of the spring 221. Therefore, a stress will not be concentrated on the floating mechanisms 58 due to a partial bending of the movable plate member 52.

Furthermore, as the strut P is moved upward, the bolts 6 extended from the upper casing 4 of the strut P are penetrated through the respectively corresponding holes 5 of the strut tower 2. In this case, the strut P is previously positioned with respect to the first robot Ra so that the respective intervals between one of the bolts 6 and adjacent bolts 6 agree with the respective intervals between one of the inserting holes 5 and adjacent inserting holes 5. After the bolts 6 have been penetrated through the respectively corresponding inserting holes 5, each of the bolts 6 is, as shown in FIG. 30, brought in contact with a lower surface of the nut 7 held by the corresponding socket 103 of each of the stationary and movable type nut runners 90 and 91. In addition, each bolt 6 pushes the corresponding socket 103 upward via the contacted nut 7 against the biasing force of the spring 105.

When each socket 103 is pushed upward by a predetermined distance, a limit switch (not shown) is actuated so that the control unit (also not shown) issues an actuation command signal to the second robot Rb. Upon receipt of the actuation command signal, the second robot Rb actuates the nut fastening tool N to rotate the rotational axle of each of the stationary and movable nut runners 90 and 91. The nut 7 within each socket 103 is, thus, turned so as to thread into the corresponding bolt 6. When each of the fastening torques of the nuts 7 has exceeded a predetermined value, the rotational axle of each nut runner 90 and 91 stops its rotation by means of the nut fastening torque detector (not shown). Consequently, the strut P is securedly attached to the strut tower 2 since the bolts 6 are moved upward as the nuts 7 are threaded into the bolts 6.

Figure 28:
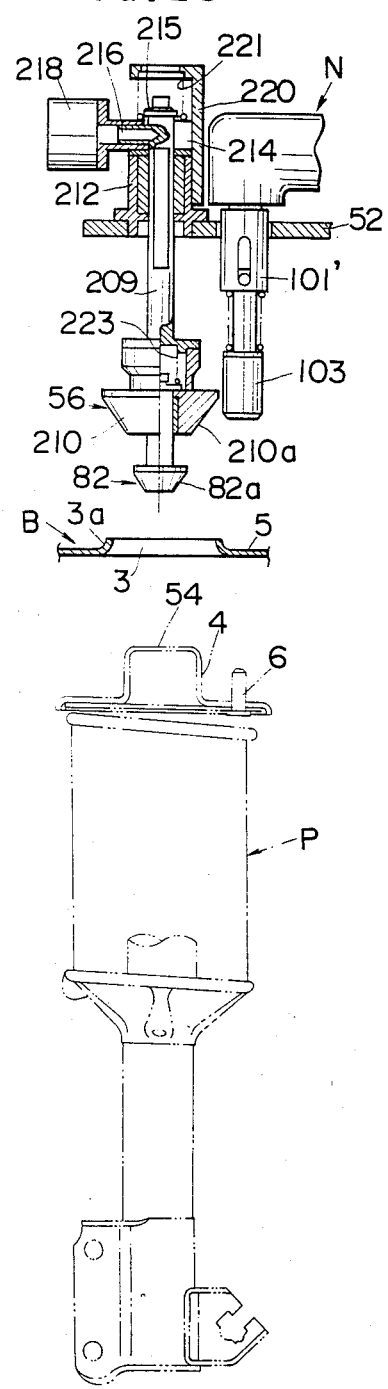
FIG. 28 is an essential part sectioned explanatory view showing that the supporting apparatus shown in FIGS. 23 through 27 is moved toward the strut tower of the vehicle body which is stopped on a conveyor belt.
Figure 33:
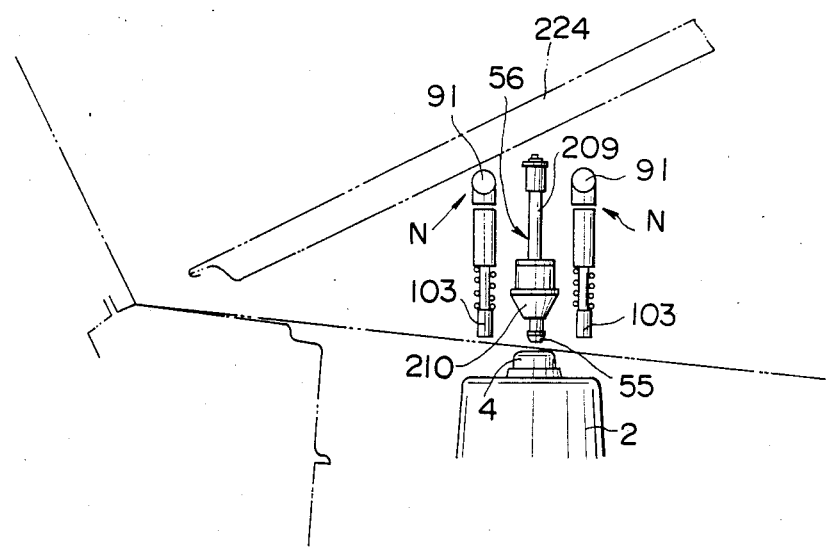
FIG. 33 is an explanatory view showing a positional relationship among the fastening tool, supporting apparatus, and vehicle body particularly a hood when the attaching operation of the strut to the vehicle body is completed.

When the nuts 7 have completely fastened the corresponding bolts 6, the second robot Rb sends the completion signal to the control unit (not shown). Upon receipt of the completion signal, the control unit issues an actuation command signal to the second robot Rb to unlock the lock member 202. In more detail, the piston rod 203a is intruded into the pneumatic cylinder 203 shown in FIG. 24 so that the braking shoe 205 is removed from the friction plate 207 and the movable plate 52 returns to the floating state. At the same time when the lock member 202 is unlocked, the control unit issues a hold command signal to the second robot Rb to hold the guide member 56. Upon receipt of the hold command signal, the second robot Rb causes the piston rod 218a of the pneumatic 218 to project from the pneumatic cylinder 218 so that the lock pin 216 presses against the shaft 209 of the guide member 56 and moves the nut fastening tool N upward until the original position shown FIG. 28 is reached, as appreciated from FIG. 32. At this time, each element of the supporting apparatus S' receives no load since the movable plate 52 is in the floating state even if the second robot Rb is moved upward.

In addition, the above-described shaft 209 is held at a position corresponding to a distance of the upward stroke of the strut P through the pressure applied by the lock pin 216 thereagainst. Therefore, a distance denoted by l in FIG. 32 between a bottom end of the engagement member 55 and lower surface of the movable plate member 52 becomes shorter, as appreciated from FIG. 32, due to the upward movement of the shaft 209, thereby substantially equal to the distance between a bottom end of each socket 103 and lower surface of the movable plate 52. Because of this situation, even if the upper casing 4 of the strut P is projected from the upper surface of the strut tower 2 so that a spatial distance in height between a hood 224 of the vehicle body B and upper casing 4 is narrowed, neither the supporting apparatus S' nor nut fastening tool N will collide with the hood 224 or other portion of the vehicle body when the second robot Rb returns the nut fastening tool N to the originally start position at which the operation of attaching the strut P to the vehicle body B starts. It should be noted that at the same time when the nut fastening tool N is returned to the originally start position, the first robot Ra removes the mechanical hand H from the strut P and moves the mechanical hand H downward from the strut P to keep a reasonable distance from the strut P until the originally start position is reached.

When each of the first and second robots Ra and Rb is returned to the originally start position, each of the mechanical hand H, nut fastening tool N, and supporting apparatus S' is prepared for the subsequent attaching operation of the strut P to the vehicle body B. For example, the piston rod 218a of the pneumatic cylinder 218 is intruded into the pneumatic cylinder 218 so that the lock pin 216 is separated from the shaft 212 and the guide member 56 moves spontaneously downward due to its own weight until the lock washer 215 rests on the upper surface of the floating member 214.

Figure 34:
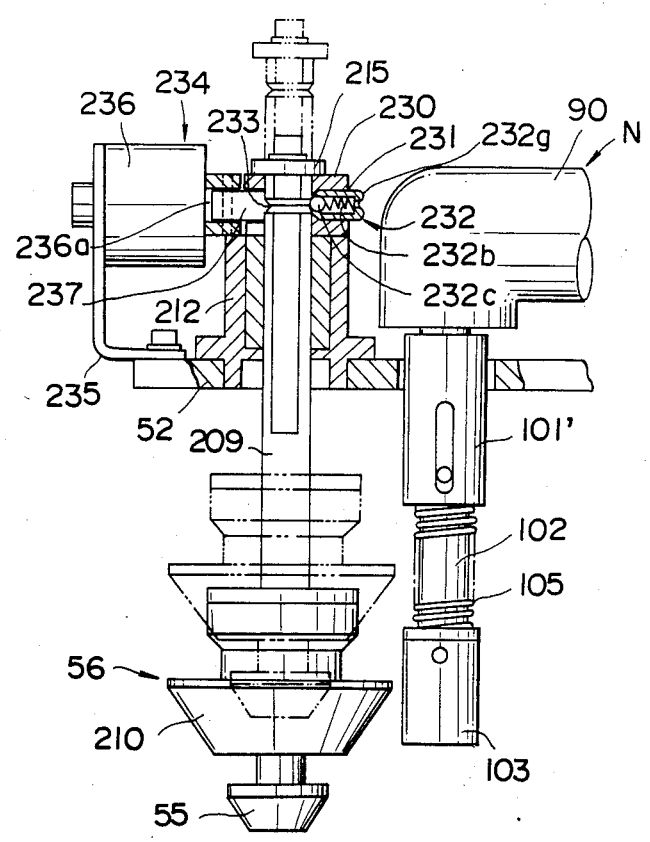
FIG. 34 is an essential part sectioned view of still another example of the supporting apparatus used in the above-described system.
Figure 35:
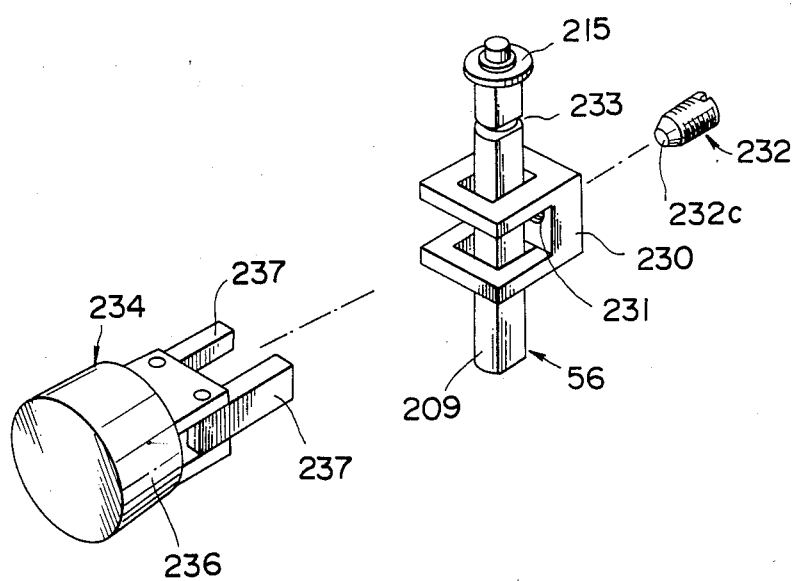
FIG. 35 is an exploded perspective view of an variation of the supporting apparatus shown in FIG. 34.

FIGS. 34 and 35 show still another example of the supporting apparatus S".

In this example, a check unit fixing bracket 230 is fixed on the guide bracket 212 so as not to interfere with the shaft 209. The check unit fixing bracket 230 is provided with a hole 231 orthogonal to the shaft 209. A check unit 232 is spirally attached to the inner wall of the hole 231. The check unit 232 comprises: (a) a cylindrical casing 232a having an opening at one end thereof; (b) a check spring 232b inserted within the cylindrical casing 232a; and (c) a check ball 232c incorporated into the opening of the cylindrical casing 232a which is biased by means of the spring 232b so as to elastically contact with the shaft 209. The check unit 232 is so designed that the spring pressure of the spring 232b can properly be adjusted by adjusting the spiral depth to the inner wall of the check unit fixing bracket 230. On the other hand, a substantially U-shaped check groove 233 is formed at a portion of the shaft 209 which is contacted with the check ball 232c, with the lock washer 215 provided at the upper end of the shaft 209 being in contact with the upper surface of the check unit fixing bracket 230, as shown by the solid line of the shaft and washer 215 in FIG. 34.

In addition, the movable plate member 52 is provided with a clamper 234 for holding the shaft 209 at a predetermined position via a fixing bracket 235.

The clamper 234 comprises: (a) a pneumatic cylinder 236 having a piston rod 236a; and (b) a pair of clamping arms 237 attached to the piston rod 236a via a linkage mechanism (not shown) which angularly open or close in response to the forward or rearward movement of the piston rod 236a.

Since the other elements of the supporting apparatus S" are the same as those of the above-described supporting apparatus S', the detailed description on these elements will not be made hereinbelow.

The operation of the supporting apparatus S" of the construction described hereinabove will be described hereinbelow.

It will be appreciated that when the positioning of the nut fastening tool N with respect to the vehicle body B is carried out by means of the guide member 56, the guide member 56 receives a reaction force from the flange 3a during the guide tapered portion 210a of the guide rod 210 being in contact with the flange 3a. However, since the engagement of the check ball 232c with the substantially V-shaped check groove 233 of the shaft 209 causes a spring force of the check spring 232b to act on the shaft 209 so that the guide member 209 is biased downward, the guide tapered portion 210a of the guide rod 210 always slides on the flange 3a and accordingly the guide 210 is fitted into the positioning hole 3 in such a way that the axis of the guide rod 210 is moved toward the center of the positioning hole 3. In this way, the positioning of the nut fastening tool N with respect to the vehicle body B is achieved by means of the guide member 56. Upon the completion of the above-described positioning, the strut P is attached to the strut tower 2 of the vehicle body B. In this situation, the guide member 56 is pushed upward together with the upward movement of the strut P. With the check ball 232c separated from the check groove 233, the spring force of the spring 232b for biasing the shaft 209 downward with respect to the movable plate member 52 does not act on the shaft 209, the guide member 56 is smoothly moved upward as the strut P is moved upward. Therefore, the movable plate member 52 will receive no load in the same way as described in the supporting apparatus S'. In addition, there is no tendency that a stress is concentrated on the floating mechanisms 58 due to the partial deformation of the movable plate member 52. It should be noted that since the shaft 209 can be grasped at a predetermined position by means of the clamper 234, the guide member 56 can be held with the guide member 56 pulled toward the movable plate member 52, for example, when the nut fastening tool N is returned to the originally start position upon completion of attaching the strut P to the vehicle body B. At this time, the height of the combination of both nut fastening tool N and supporting apparatus S" can be reduced and thus neither the nut fastening tool N nor supporting apparatus S" will collide with the hood 224 or other portions of the vehicle body B.

Although in these types of the supporting apparatus S' and S" there are provided with means for biasing the guide member 56 toward a predetermined direction and means for releasing the biasing of such biasing means, the constructions of these means may be changed properly.

Figure 36A:
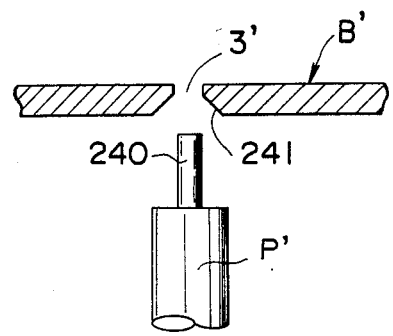
FIGS. 36(a) through 36(c) show variations of the sub-assemblies having engagement portions with the main assembly.

It should be noted that as shown in FIG. 36(a), when another sub-assembly, i.e., workpiece P' except the strut P is attached to the main assembly such as the vehicle body B, an engagement convex 240 may be provided at the other sub-assembly P', while a positioning hole 3' located at another assembled member B' of the vehicle body B may also be provided with a guide tapered opening 241 for leading the convex 240 provided at the upper casing of the other sub-assembly P' to fit into the positioning hole 3' in such a way that the axis of the convex 240 slides on the tapered opening 241 toward the center of the positioning hole 3'.

Figure 36B:
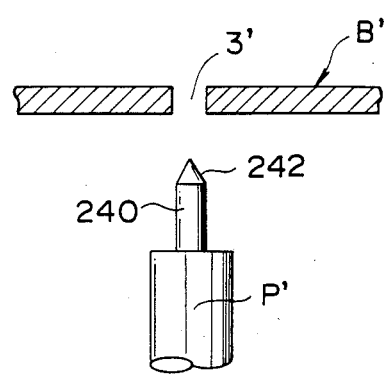

Alternatively, as shown in FIG. 36(b), a circular truncated cone shaped guide projection 242 may be provided at a tip of the above-described convex 240, the positioning hole 3' having no such a guide tapered opening.

Figure 36C:
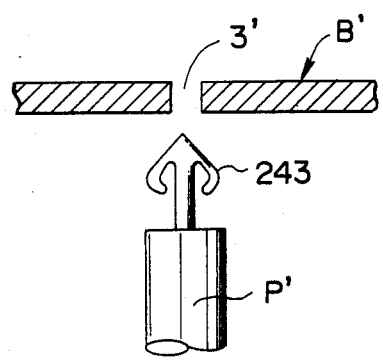

Alternatively, as shown in FIG. 36(c), a guide clip 243 may be provided at the upper casing of the other sub-assembly P', the positioning hole 3' having no such a guide tapered opening. In this way, various design modifications may be made for the sub-assembly to engage with the positioning hole of the main assembly.

As described hereinbefore, since the method and system for automatically attaching a sub-assembly to a main assembly according to the present invention obtain a positional relationship between the sub-assembly and a fastening tool, the sub-assembly being grasped and carried by a mechanical hand attached to one of the two robots to a required position of the main assembly and the fastening tool being carried by the other robot via a supporting apparatus to a required position of the main assembly and thereafter obtain positional relationships of the prepositioned sub-assembly and fastening tool relative to the main assembly, with the sub-assembly and fastening tool being made passively float with respect to the main assembly, the sub-assembly and fastening tool can easily be positioned in a very short time with respect to the main assembly although the accuracy of a position at which the main assembly transported by a conveyor belt is stopped for assembly operation is relatively low and no special control is needed for positioning the sub-assembly, fastening tool and main assembly respectively.

Therefore, the working time for attaching the sub-assembly to the main assembly can remarkably be reduced and automatic attaching operation can be achieved without the complication of the system itself.

It will be fully appreciated from those skilled in the art that the foregoing description is made in terms of preferred embodiment of the present invention wherein various changes and modifications may be made without departing from the spirit and scope of the present invention, which is to be defined by the appended claims.

What is claimed is:

1. A system for automatically attaching a workpiece to a main workpiece, the main workpiece being transported on a transporting means, comprising:
   (a) first means for automatically carrying the workpiece toward a predetermined position of the main workpiece at which the workpiece is to be attached to the main workpiece, the main workpiece being stopped on the transporting means;
   (b) second means for automatically carrying an automatic fastening tool holding fastening means toward the predetermined position of the main workpiece so that the main workpiece is sandwiched between said fastening tool and workpiece;
   (c) third means for engaging said second means with said first means so as to position the workpiece with respect to the fastening tool;
   (d) fourth means for slidably engaging said second means positioned with respect to the workpiece with the main workpiece so as to position the workpiece and fastening tool with respect to the main workpiece; and
   (e) fifth means for actuating said fastening tool positioned with respect to the main workpiece to fasten the workpiece to the predetermined position of the main workpiece with said fastening means.

2. The automatically workpiece attaching system as set forth in claim 2, which further comprises: (a) sixth means for rendering said fastening tool floatable with respect to said second means when said fourth means engages said second means with the main workpiece; and (b) seventh means for rendering the workpiece positioned with respect to said fastening tool floatable with respect to said first means when said fourth means engages said second means with the main workpiece.

3. The automatically workpiece attaching system as set forth in claim 1, wherein said fourth means engages said second means with the main workpiece in such a way that said fourth means is moved toward a center of a positioning hole provided at the predetermined position of the main workpiece.

4. A system for automatically attaching a sub-assembly to a main assembly, the main assembly being transported on a conveyor belt and having a positioning portion at a predetermined position thereof on a basis of which the sub-assembly is fixedly attached to the main assembly by means of fastening means and a predetermined number of holes around the positioning portion and the sub-assembly by means for securing the sub-assembly to the main assembly by means of said fastening means and an engagement portion at a predetermined position thereof, comprising:
   (a) an automatic fastening tool which operatively fastens said fastening means to said securing means of the sub-assembly via the corresponding holes of the main assembly so that the sub-assembly is fixedly attached to the main assembly at the predetermined position of the main assembly;
   (b) a supporting arrangement which supports said fastening tool, said supporting arrangement including a base member fixed to a multi-articulated arm of at least one robot, a movable member supported on said base member in parallel thereto so as to be operatively floatable with respect to said base member and on which said fastening tool is fixedly supported, first means, interposed between said movable member and base member, for locking and unlocking said movable member so as to render said movable member respectively fixed and floatable with respect to said base member, an engagement member attached to said movable member for engaging the engagement portion of the sub-assembly, said first locking means locking said movable member when said engagement member is engaged with the engagement portion of the sub-assembly, and a guide member attached to said movable member for engaging with said positioning portion of the main assembly in such a way that said member is moved toward a center of positioning portion of the main assembly, said locking means unlocking said movable member so as to passively float in accordance with the movement of said guide member when said guide member is engaged with the positioning portion of the main assembly; and
   (c) a hand arrangement, including a main frame fixed to another multi-articulated arm of said robot, a pair of clamping members which operatively grasps the sub-assembly in such a way that the sub-assembly is fixedly grasped when said engagement member of said supporting arrangement is engaged with the engagement portion of the sub-assembly so as to position said fastening tool relative to the sub-assembly and the sub-assembly is floatingly grasped at least along a plane parallel to that of the positioning portion of the main assembly when said guide member of said supporting arrangement is engaged with their positioning portion of the main assembly so as to position said fastening tool and sub-assembly with respect to the main assembly, and second means for locking and unlocking said pair of clamping members so as to render the sub-assemby fixedly grasped and floatingly grasped by said pair of clamping members.

5. The automatically attaching system as set forth in claim 4, wherein the sub-assembly is a strut assembly of an automotive vehicle's strut type front suspension and the main assembly is a vehicle body, wherein the positioning portion of the main assembly is a positioning hole having a flange at the edge thereof located at a strut tower of the vehicle body, the securing means of the sub-assembly is at least one bolt projected from the strut assembly and the engagement portion of the sub-assembly is an engagement hole located at an upper casing of the strut assembly and wherein said main frame of said hand arrangement comprises: (a) a base plate having a hole; (b) a first bracket located at a lower surface of said base plate and linked with the multi-articulated arm of said robot; (c) a supporting shaft extended from the hole of said base plate for supporting one end of the strut assembly so that the strut assembly is vertically slidable; (d) a stopper provided at the lower end of the supporting shaft; (e) a first spring interposed between an upper flange of said supporting shaft and said base plate for biasing the supporting shaft upward; (f) a supporting pole extended vertically from said base plate in parallel with said supporting shaft; (g) a pair of blocking plates extended horizontally from said supporting pole toward said supporting shaft for fitting a fixing bracket projected from an axle of the strut assembly thereinto; (h) at least one supporting plate formed at the upper end of said supporting pole; (i) a supporting rod extended vertically through said supporting plate so as to slide in the axial direction thereof; (j) a stopper fixed at a lower end of said supporting rod; (k) a second bracket attached to upper ends of said supporting rod for movably attaching each of said pair of clamping members to said supporting rod; and (l) at least one second spring interposed between said second bracket and supporting plate so that said supporting rod is biased upward.

6. The automatically attaching system as set forth in claim 5, wherein said pair of clamping members of said hand arrangement comprises: (a) a pair of movable arms pivotally fixed to said second bracket of said main frame by means of an axle and which angularly open and close in a plane in parallel with said base plate; (b) at least one floating mechanism located at each of said pair of movable arms; and (c) a pair of contacting plates one attached to a portion of said movable arm via said floating mechanism so as to face with the other contacting plate.

7. The automatically attaching system as set forth in claim 6, wherein each of said pair of movable arms and said pair of contacting plates includes an elongated rod and two arms each extended from one end of said elongated rod substantially at an angle of 45° and arranged symmetrically with each other and said floating mechanism provided at the corresponding arms of each of said movable arms and contacting plate so that said floating mechanism is directed toward a center of the axle of the strut assembly.

8. The automatically attaching system as set forth in claim 6, wherein said main frame further comprises: (a) a first pair of pneumatic cylinders each having a piston rod linked with one end of each of said pair of clamping arms so that said pair of movable arms are angularly opened according to the extensile movement of said piston rods; and (b) a stopper piece provided at said second bracket and wherein said pair of clamping members further comprise a pair of bolts projected from opposing sides of said pair of movable arms for limiting a closed position of said movable arms when said pair of bolts are brought in contact with said stopper piece.

9. The automatically attaching system as set forth in claim 6, wherein said floating mechanism comprises: (a) a first spherical bearing fitted into a corresponding hole provided at each clamping arm; (b) a sleeve axially supported on said first spherical bearing via a hollowed spherical axle; (c) a slidable rod slidably attached within said sleeve; (d) a second spherical bearing fixedly inserted through a hole; (e) a linkage axially supported on said second spherical bearing via a hollowed spherical axle and fixed to a tip of said slidable rod; (f) a third spring interposed between a washer attached to a tip of said slidable rod and a flange integrally provided at said sleeve for biasing said slidable rod toward the center of the axle of the strut assembly; and (g) a lock washer provided at one end of said slidable rod for contacting with one end of said sleeve so as to limit a movable range of said slidable rod.

10. The automatically attaching apparatus as set forth in claim 6, wherein said second lock means comprises: (a) a second pair of pneumatic cylinders each located outside of said corresponding movable arm and having a piston rod which operatively extends toward the center of the axle of the strut assembly from each of said second pair of pneumatic cylinder; (b) structure defining an inserting hole provided at each of said movable arms for inserting said piston rod of each of said second pair of pneumatic cylinders; and (c) an adapter inserted through said inserting hole of each of said pair of movable arms via a bearing and linked with said piston rod, which is brought in contact with a surface of each of said pair of contacting plates faced with said corresponding movable arm so that said pair of contacting plates are pressed against the axle of the strut assembly when each of said piston rods is extended from the corresponding second pneumatic cylinder.

11. The automatically attaching system as set forth in claim 5, wherein said base member of said supporting apparatus comprises: (a) a base plate; and (b) a third bracket located at a lower surface of said base plate and linked with the multi-articulated arm of said robot and wherein said supporting arrangement further comprises a plurality of floating mechanism supporting said movable member, each floating mechanism comprising: (a) a rotating shaft fitted into a hole of said base plate via a bearing; (b) a casing linked with a tip of said rotating shaft; (c) a sliding shaft which slides within said casing along a plane in parallel with said base plate; and (d) a linkage shaft having one end thereof linked with a tip of said sliding shaft and the other end thereof fitted into a hole of said movable member via a bearing so that said movable member is moved in an arbitrary direction holding a parallel positional relationship to said base plate.

12. The automatically attaching system as set forth in claim 11, wherein said first lock means of said supporting arrangement comprises: (a) at least one electromagnet brake arrangement provided at said rotating shaft of at least one of said floating mechanisms for locking the rotation of said rotating shaft, said electromagnet brake arrangement including a cylindrical electromagnet fixed to the lower surface of said base plate and through which said rotating shaft is penetrated; and (b) a coupling provided so as to face a lower surface of said electromagnet brake arrangement and linked with a lower end of said rotating shaft, said coupling being spaced apart from said electromagnet brake arrangement when said electromagnet brake arrangement is deenergized so as to freely rotate said rotating shaft of said corresponding floating mechanism and said coupling being in contact with said electromagnet brake arrangement when said electromagnet brake arrangement is energized so as to lock the rotation of said rotating shaft to fix said movable member at a predetermined position.

13. The automatically attaching apparatus as set forth in claim 5, wherein said first lock means of said supporting arrangement comprises: (a) a third pneumatic cylinder fixed to said base member via a third bracket having a piston rod which operatively extends toward said movable member; (b) a brake shoe formed of an elastic member and attached to a tip of said piston rod of said third pneumatic cylinder via a fourth bracket; and (c) a friction plate attached to a surface of said movable member which faces toward said brake shoe and formed by knurling, so that said brake shoe is pressed against said friction plate when said piston rod is extended from said third pneumatic cylinder, thus said movable member being fixed to said base member and said brake shoe is spaced apart from said friction plate when said piston rod is not extended from said third pneumatic cylinder, thus said movable member being float to said base member.

14. The automatically attaching system as set forth in claim 5, wherein said guide member of said supporting arrangement comprises:

(a) a sliding shaft an upper end thereof attached to said movable member via a fifth bracket, which slides vertically with respect to said movable member; (b) a guide plate having an inverted cylindrical truncated cone shaped guide tapered portion attached to a lower end of said sliding shaft which operatively fits into the positioning hole of the strut tower of the vehicle body; and (c) a third spring intervened between said guide plate and third bracket for biasing said guide plate downward with respect to said movable member, and wherein said engagement member is projected from said guide plate and comprises: (a) a lock weather engaged with a step within a hollow provided at said guide plate; (b) a sliding shaft provided coaxially with respect to said sliding shaft of said guide member with an upper end thereof being attached to an inner wall of said hollow of said guide plate and a lower end thereof having an inverted cylindrical truncated cone shaped engagement tapered portion which operatively fits into the engagement hole of the strut assembly; and (c) a fourth spring interposed between said step and said engagement tapered portion for biasing said sliding shaft of said engagement member downward with respect to said guide member.

15. The automatically attaching apparatus as set forth in claim 5, wherein said supporting arrangement further comprises a lock mechanism for determining a floating distance by which said movable member can float, said lock mechanism including: (a) a pair of locative holes provided at predetermined positions of said movable members, each having an inverted cylindrical truncated cone portion in section at a lower surface of said movable member which faces toward said base plate and a cylindrical portion in section at an upper surface of said movable member; (b) a pair of locative pins provided at predetermined positions of a supporting plate located between said base plate and movable member each having a cylindrical truncated cone portion and cylindrical portion projected from said inverted cylindrical truncated cone portion thereof; (c) a fourth pneumatic cylinder attached to said base plate via a fifth bracket and having at substantially center portion thereof a piston rod which operatively extends from said fourth pneumatic cylinder toward said movable member so that each of said cylindrical truncated cone portions of said pair of locative pins is fitted into said corresponding inverted cylindrical truncated cone portion of said pair of locative holes so as to fix said movable member to said base plate when said piston rod is extended from said fourth pneumatic cylinder so as to move said pair of locative pins upward, and each of said cylindrical portions of said pair of locative pins is fitted into said corresponding inverted cylindrical truncated cone portion of each of said pair of locative holes with play when said piston rod is not extended from said fourth pneumatic cylinder, said play being sufficient to determine the distance of floating of said movable member; (d) an adapter, a lower end thereof being attached to a tip of said piston rod of said fourth pneumatic cylinder and an upper end thereof being attached to said supporting plate, which is slidably fitted into a sixth bracket fixed to said fourth pneumatic cylinder; and (e) means for stopping the rotation of said supporting plate so as to move said supporting plate vertically toward and away from said movable member.

16. The automatically attaching system as set forth in claim 13, wherein said supporting arrangement further comprises: (a) a pair of seventh brackets located above both sides of an upper surface of said movable member so as to embrace both sides thereof having a gap formed between a projecting piece of each of said pair of seventh brackets and upper surface of said movable member so that said pair of seventh brackets are held in non-contacting state with said movable plate when sliding portions of members constituting each of floating mechanisms creating clearance between each member thereof and said gap limiting the upward movement of said movable member when said movable member is pressed upward by means of said brake shoe.

17. The automatically attaching system as set forth in claim 5, wherein said guide member of said supporting arrangement comprises:

(a) a shaft penetrated through a hole of said movable member and slidably supported within an eighth bracket via a bushing; and (b) a guide plate having a guide tapered portion in an inverted cylindrical truncated cone shape for fitting the positioning hole of the strut tower of the vehicle assembly, and wherein said engagement member is projected from said guide plate and comprises: (a) a lock washer engaged with a step within a hollow provided at said guide plate; (b) a shaft provided coaxially with respect to said shaft of said guide member, an upper end thereof being engaged with said lock washer and a lower end thereof having an inverted truncated cone shaped engagement tapered portion which operatively fits into the engagement hole the strut assembly so as to position of said fastening tool with respect to the strut assembly; and (c) a fifth spring interposed between an inner wall of said hollow of said guide plate and upper end of said shaft for biasing said shaft of said engagement member downward with respect said guide member.

18. The automatically attaching system as set forth in claim 17, wherein said supporting arrangement further comprises; (a) a floating member located on said eighth bracket for supporting said shaft of said guide member; (b) a first hole through which said shaft of said guide member is penetrated; (c) a second hole located within said floating member orthogonal to said first hole; (d) a lock pin arranged within said second hole via a bushing so as to move orthogonally toward said shaft of said guide member; (e) a fifth pneumatic cylinder having a piston rod at an extended end of which said lock pin is attached which operatively extends from said fifth pneumatic cylinder so as to fit said lock pin into said hole of said shaft of said guide member; (f) a ninth bracket having an inverted L-shaped section located on said eighth bracket so as to cover the upper end of said floating member, securing the upward and downward movements of said movable member, and having an inserting hole through which said guide member is penetrated; and (g) a sixth spring intervened between said ninth bracket and floating member for biasing said floating member downward so as to rest said floating member on said eighth bracket.

19. The automatically attaching system as set forth in claim 17, wherein said supporting arrangement further comprises: (a) a tenth bracket fixed to an upper portion of said eighth bracket so as not interfere with said shaft of said guide member and having a hole orthogonal to said shaft of said guide member; (b) a check unit spirally mounted within said hole of said tenth bracket, said check unit including a cylindrical casing having an opening at one end thereof, a check spring incorporated into said cylindrical casing one end thereof being fixed to said opening, and a check ball incorporated into said cylindrical casing, fixed to the other end of said check spring, and biased toward said shaft of said guide member by means of said check spring; (c) a substantially V shaped check groove provided at said shaft of said guide member so as to receive said check ball incorporated into said cylindrical casing; and (d) a holding clamper attached to said movable member via an eleventh bracket for holding said shaft of said guide member at a predetermined position, said holding clamper including a pair of clamping arms which operatively closes so as to hold said shaft of said guide member and a sixth pneumatic cylinder having a piston rod attached to said pair of clamping arms which operatively extends from said sixth pneumatic cylinder so as to open said clamping arms.

* * * * *